US012603799B2

(12) United States Patent
Patel et al.

(10) Patent No.: US 12,603,799 B2
(45) Date of Patent: Apr. 14, 2026

(54) SYSTEM AND METHOD FOR URSP-BASED TUNNELING THROUGH FIXED WIRELESS ACCESS

(71) Applicant: Verizon Patent and Licensing Inc., Basking Ridge, NJ (US)

(72) Inventors: Samirkumar Patel, Middlesex, NJ (US); Deepa Jagannatha, Bridgewater, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 520 days.

(21) Appl. No.: 17/821,201

(22) Filed: Aug. 22, 2022

(65) Prior Publication Data

US 2023/0291607 A1 Sep. 14, 2023

Related U.S. Application Data

(63) Continuation-in-part of application No. 17/690,309, filed on Mar. 9, 2022.

(51) Int. Cl.
H04L 12/46 (2006.01)
H04L 47/12 (2022.01)

(52) U.S. Cl.
CPC .......... H04L 12/4633 (2013.01); H04L 47/12 (2013.01)

(58) Field of Classification Search
CPC ..... H04L 12/4633; H04L 47/12; H04L 45/04; H04L 45/306
See application file for complete search history.

(56) References Cited

U.S. PATENT DOCUMENTS

| | | |
|---|---|---|
| 2019/0394279 A1 | 12/2019 | Dao et al. |
| 2020/0178196 A1* | 6/2020 | Wang .................. H04W 60/005 |
| 2020/0267785 A1 | 8/2020 | Talebi Fard et al. |
| 2021/0259028 A1 | 8/2021 | Zhang |
| 2022/0116327 A1* | 4/2022 | Salkintzis ......... H04W 28/0865 |

(Continued)

FOREIGN PATENT DOCUMENTS

| | | |
|---|---|---|
| AU | 2019390331 | 6/2020 |
| CN | 113498086 A * | 10/2021 |
| CN | 113923114 | 1/2022 |

OTHER PUBLICATIONS

Li, "method for adjusting access network slice, communication device, network slice and system", CN-113498086-A, pp. 1-75 (Year: 2021).

*Primary Examiner* — Steven Hieu D Nguyen

(57) ABSTRACT

A device includes a memory to store a User Equipment Route Selection Policy (URSP) and one or more processors. The one or more processors are configured to: obtain network traffic comprising first network traffic and second network traffic, wherein the second network traffic originates from one or more user equipment devices (UEs); apply the URSP to the network traffic; and in response to applying the URSP, forward protocol data units (PDUs) of the network traffic to either a first tunnel to a first network slice or a second tunnel to a second network slice. The first tunnel and the second tunnel are established from the device to the first network slice and the second network slice over communication paths that include at least a wireless communication link from the device to a radio access network (RAN).

20 Claims, 17 Drawing Sheets

(56)     References Cited

U.S. PATENT DOCUMENTS

| | | | |
|---|---|---|---|
| 2022/0239397 A1 | 7/2022 | Zemach | |
| 2022/0272031 A1* | 8/2022 | Miklós | H04W 40/02 |
| 2022/0322199 A1 | 10/2022 | Jang | |
| 2022/0377654 A1* | 11/2022 | Soliman | H04W 28/0875 |
| 2023/0052670 A1* | 2/2023 | Huang-Fu | H04L 45/306 |
| 2023/0156562 A1* | 5/2023 | Thiebaut | H04W 40/22 |
| | | | 370/315 |
| 2023/0276337 A1 | 8/2023 | Hui | |
| 2024/0187863 A1 | 6/2024 | Atarius | |

* cited by examiner

100

NETWORK
102

CUSTOMER
PREMISES 104

110

FIXED WIRELESS ACCESS (FWA) 108

USER DEVICE
106-1

USER DEVICE
106-2

USER DEVICE
106-3

USER DEVICE
106-4

Figure 5A:
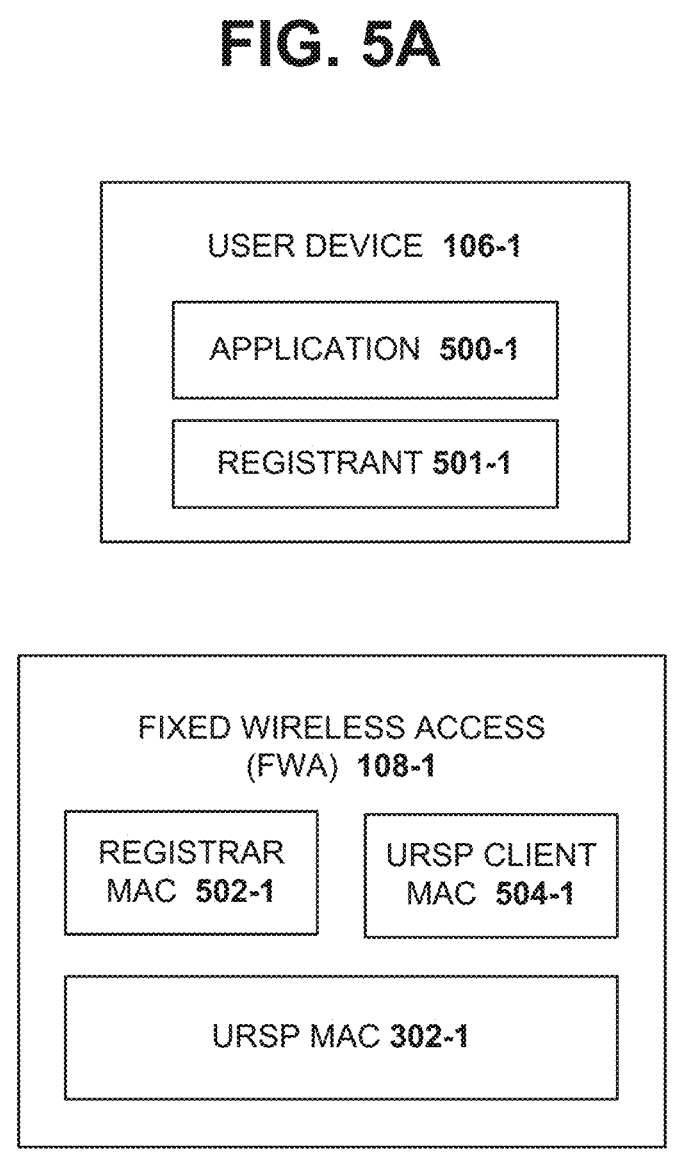

USER DEVICE 106-1

APPLICATION 500-1

REGISTRANT 501-1

FIXED WIRELESS ACCESS
(FWA) 108-1

REGISTRAR
MAC 502-1

URSP CLIENT
MAC 504-1

URSP MAC 302-1

FIG. 5B

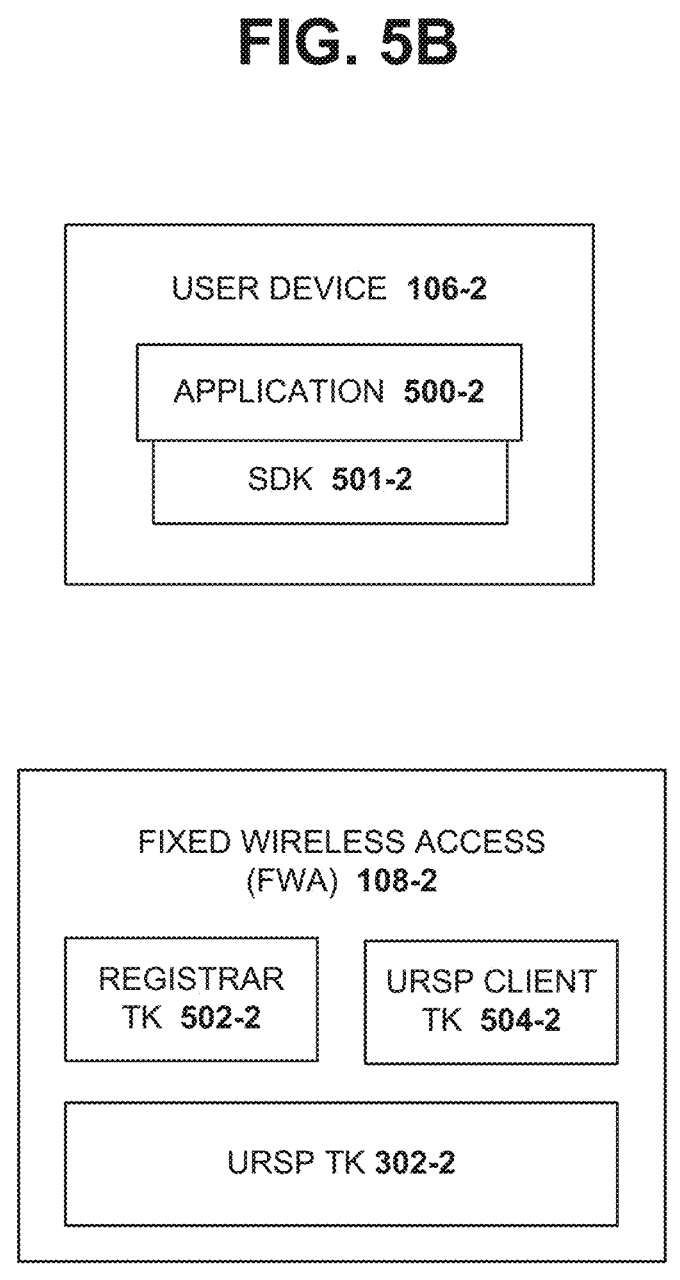

USER DEVICE 106-2

APPLICATION 500-2

SDK 501-2

FIXED WIRELESS ACCESS
(FWA) 108-2

REGISTRAR
TK 502-2

URSP CLIENT
TK 504-2

URSP TK 302-2

FIG. 5D

URSP MANAGEMENT SYSTEM  212

| AUSF 506 | UDM/ UDR 508 | URSP SERVER 510 |

600

RECEIVE REQUEST
602

START REGISTRATION
604

IDENTIFIED?
606

YES → STORE; REPLY
608

NO

SEND REQUEST
610

RECEIVE INFORMATION
612

PERFORM UPDATE
614

RECEIVE PACKETS
616

APPLY URSP
618

| USE CASE #1 | USE CASE #2 | USE CASE #3 | USE CASE #4 |
|---|---|---|---|
| IMS: DEFAULT DNN | IMS: DEFAULT DNN | IMS: DEFAULT DNN | IMS: DEFAULT DNN |
| ADMIN: DEFAULT DNN | ADMIN: DEFAULT DNN | ADMIN: DEFAULT DNN | ADMIN: DEFAULT DNN |
| INTERNET: ULTRA DNN | INTERNET: ULTRA DNN | INTERNET: DEFAULT DNN | INTERNET: DEFAULT DNN |
| RTR: ULTRA DNN | RTR: ULTRA DNN | RTR: DEFAULT DNN | RTR: DEFAULT DNN |
|  |  | GAMING: ULTRA DNN | GAMING: ULTRA DNN |

1100

SYSTEM AND METHOD FOR URSP-BASED TUNNELING THROUGH FIXED WIRELESS ACCESS

CROSS-REFERENCE TO RELATED APPLICATION

This application is a continuation-in-part of U.S. patent application Ser. No. 17/690,309, filed on Mar. 9, 2022, and titled "System and Method for URSP-based Tunneling through Fixed Wireless Access," the disclosure of which is incorporated by reference herein in its entirety.

BACKGROUND INFORMATION

Advanced wireless networks incorporate many innovative features that may not be present in legacy networks. For example, a Fifth Generation (5G) network may incorporate network slicing technology to increase network efficiency and performance. As another example, a 5G network may provide a mobile device with a User Equipment (UE) Route Selection Policy, to enable the mobile device to access particular services. In contrast, a Long Term Evolution (LTE network provides a mobile device that it serves with Access Point Names (APNs) to enable the device to access services.

BRIEF DESCRIPTION OF THE DRAWINGS

FIG. 5A shows exemplary components of a user device and an FWA device according to an embodiment;

FIG. 5B shows exemplary components of a user device and an FWA device according to another embodiment;

FIG. 5D shows exemplary components of a URSP Management System, according to an embodiment;

FIGS. 8A-8D illustrate selecting, by an FWA, routes for different network traffic types, according to different implementations;

FIG. 9 illustrates a table that summarizes different traffic descriptors (TDs) and route selection descriptors (RSDs) in a URSP;

DETAILED DESCRIPTION OF EMBODIMENTS

The following detailed description refers to the accompanying drawings. The same reference numbers in different drawings may identify the same or similar elements.

Systems and methods described herein relate to a User Equipment (UE) Route Selection Policy (URSP)-rule (herein referred to as URSP rule or simply URSP) based tunneling through Fixed Wireless Access devices (FWAs). FWAs typically includes a modem and a router. Routers are designed to perform a number of functions: process routable protocols, use routing protocols to determine best routing paths, and route Internet Protocol (IP) packets through networks. When FWAs are placed in Fifth Generation (5G) networks, the routers within the FWAs are required to follow telecommunications standards. The standards include requirements on what is referred to as network slicing. Thus, for example, routers in 5G FWAs (e.g., Customer Premises Equipment (CPE), a combination of a CPE and a router, a router/modem, a wireless router/modem, etc.) are required to follow telecommunications standards to operate in networks that provide or use network slicing. For example, a CPE device might be required to forward a packet to a particular network slice based on a Quality-of-Service (QoS) indicator that is associated with the packet. Currently, however, routers in FWAs are not typically designed to perform network slice-dependent functions to support applications requesting network services or based on the QoS of the traffic. In particular, these routers do not host slice-aware application components and cannot identify different slice traffic over the wireless Local Area Network (LAN) or to classify them based on URSPs. The systems and methods described herein relate to implementations of routers and modems (e.g., CPEs or FWAs) that perform URSP-based tunneling or packet forwarding.

Figure 1:
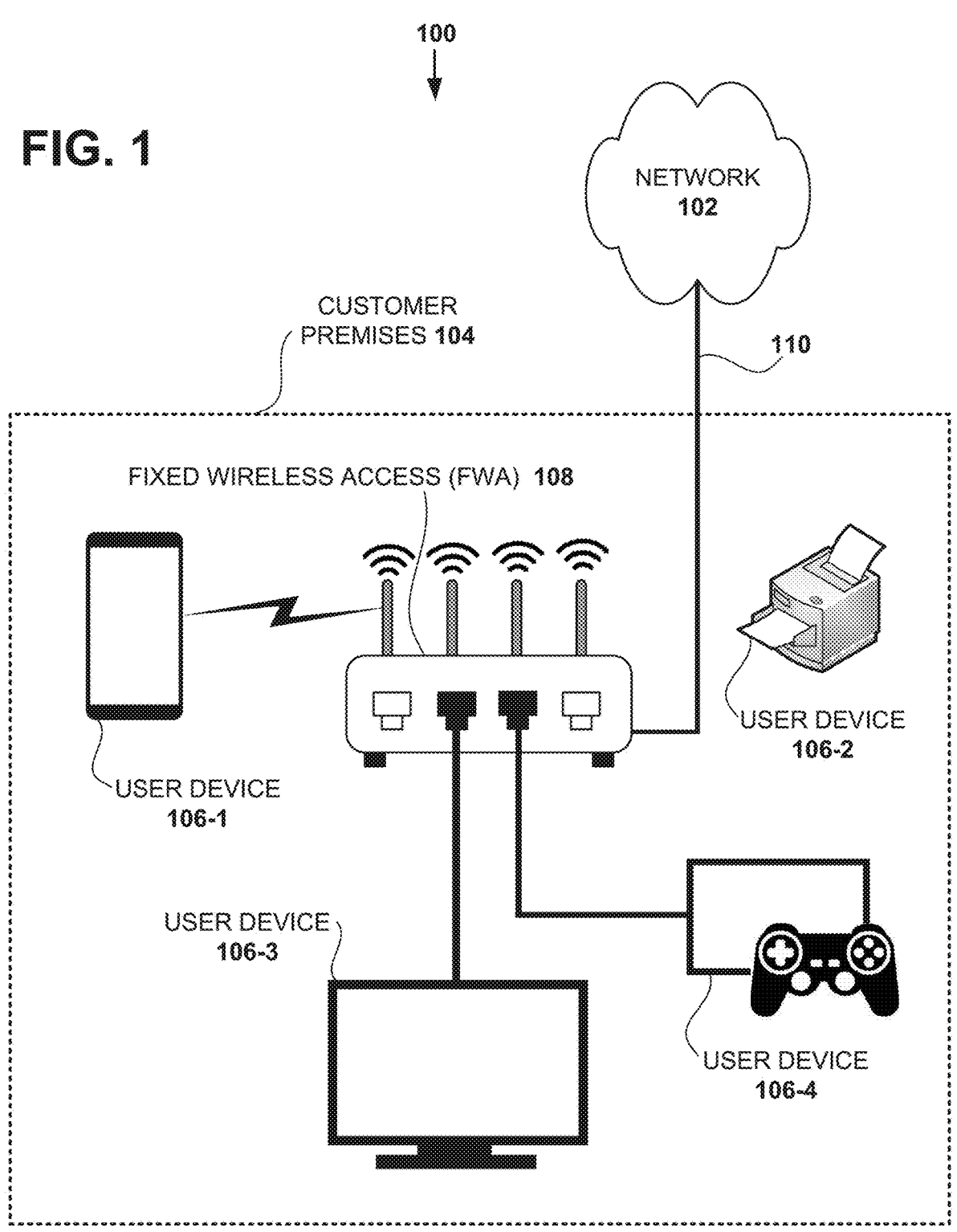
FIG. 1 illustrates an exemplary system environment according to an embodiment described herein.

FIG. 1 illustrates the concepts described herein. As shown, an environment 100 includes a network 102 and a customer premises 104. Network 102 may be operated by a communications service provider (e.g., Verizon™, etc.). Network 102 may also be referred to as provider network 102. Customer premises 104 (also referred to as premises 104) may include an area occupied by a customer of the service provider. Network 102 may provide, to the customer at the customer at premises 104, various communications services, such as an Internet access service, cellular services, content services (e.g., cable services), over a wireless communication link 110.

At customer premises 104, devices 106-1 through 106-4 (e.g., smart appliances, computers, smart television (TV), wireless printers, etc.) connect to a Fixed Wireless Access device (herein referred to as FW device 108 or FWA 108). It should be understood that the concepts described herein, however, apply not only to FWAs, but routers, router-like devices, and/or modems. Also, as used herein, the term "packets" may refer not only to IP packets (e.g., IPv6) but also Protocol Data Units (PDUs).

In contrast to legacy routers, FWA 108 supports network slicing. More specifically, FWA 108 has the ability to apply a URSP, which may have been received from network 102. By applying the URSP to the incoming traffic from devices 106, FWA 108 may forward packets from devices 106 to appropriate network slices.

For FWA 108 to direct each of packets from devices 106 to appropriate network slices, FWA 108 needs application-specific or device-specific information with respect to devices 106 in customer premises 104. Thus, before FWA 108 can direct packets from devices 106 to network slices, a mechanism is installed on devices 106 and/or FWA 108, such that each packet sent from devices 106 (through the mechanism) provides an identifier. FWA 108 may identify each packet with the identifier and pass the packet to a modem (either internal to FWA 108 or external to FWA 108) that uses the URSP to route the packet to a network slice with the matching identifier from a set of traffic descriptors (to be described below).

In one implementation, FWA 108 uses a Media Access Control (MAC) address as the identifier. According to the implementation, FWA 108 includes a database that maps a set of MAC addresses to traffic descriptors (TDs) that can be used in conjunction with the URSP to identify network slices. MAC addresses that have been mapped to the TDs are herein referred to as mapped MAC addresses.

For example, if FWA 108 receives a packet over an Ethernet frame whose source or destination address is one of the mapped MAC addresses, FWA 108 may use the MAC address of the Ethernet frame for the packet to identify the corresponding TD. FWA 108 may pass the packet to a modem (either internal to FWA 108 or external to FWA 108) that uses the URSP to route the packet to a network with a matching traffic descriptor (to be described below).

In this implementation, among all the devices 106, devices 106 that are linked wirelessly to FWA 108 are fitted with Ethernet adapters. Each of the Ethernet adapter has one of the mapped MAC addresses. If FWA 108 has Ethernet cable ports, each of the port is also assigned one of the mapped MAC addresses. Thus, any packet on an Ethernet frame from a device 106 bears one of the mapped MAC addresses and the MAC address can be used to look up the corresponding TD. FWA 108 may use the TD and the URSP to identify the network slice to which the packet is to be forwarded.

In a different implementation, FWA 108 may include a communication application that manages connection requests from devices 106. The communication application includes a lookup table that maps a set of tokens to different TDs (herein referred to as mapped tokens). Thus, when FWA 108 receives a connection request along with one of the mapped tokens from device 106, the communication application on FWA 108 may use the token to look up the corresponding TD in the table, use the TD and the URSP to identify the network slice to which the session packets are to be forwarded, and forward the packets to the network slice.

In this implementation, ach of devices 106 includes a Software Development Kits (SDKs) that relays data to and/from an application on device 106 to FWA 108. When an SDK on device 106 sends a connection request from an application on device 106 to FWA 108, the SDK also sends a token (one of the mapped tokens), which FWA 108 can use to identify the corresponding TD for applying the URSP and forwarding the packet to a network slice.

Figure 2:
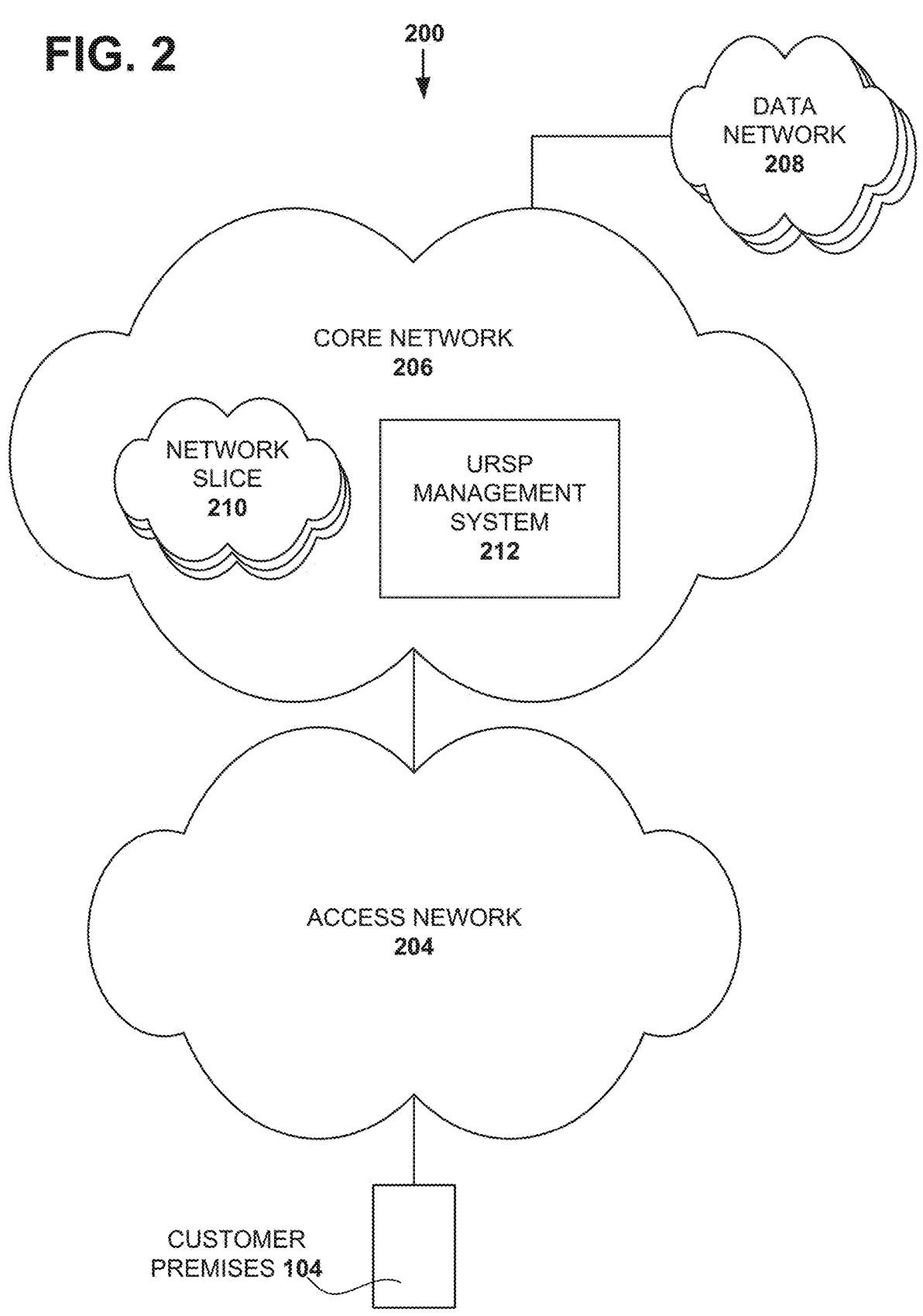
FIG. 2 illustrates an exemplary network environment in which the system and methods described herein may be implemented.

FIG. 2 illustrates an exemplary network environment 200 in which the system and methods described herein may be implemented. As shown, environment 200 may include customer premises 104, an access network 204, a core network 206, and a data network 208. Access network 204, core network 206, and data network 208 may be part of network 102 of FIG. 1. Components of the system for URSP-based tunneling through FWAs 108 may reside within customer premises 104, access network 204, core network 206, and/or data network 208. The system may enable distribution of a URSP to FWA 108, and FWA 108 may apply the URSP to network traffic from devices 106 in the premises 104—to select network slices for the traffic and enable forwarding of the traffic to the selected network slices.

Customer premises 104, as already described, may include a physical area which a customer of the service provider may occupy. Access network 204 may deliver various communication and/or content services to FWA 108 and other devices 106 in customer premises 104.

Access network 204 may include a network through which customer devices may communicate with core network 206 and other devices attached to core network 206. For example, access network 204 may include a local area network (LAN), a WIFI network, a wireless LAN, or another type of network. In some implementations, access network 204 may also include radio networks, such as a 5G radio network, a Fourth Generation (4G) radio network (e.g., Long-Term Evolution (LTE) radio network), or another type of radio network. These radio networks may operate in many different frequency ranges, including millimeter wave (mm-Wave) frequencies, sub 6 GHz frequencies, and/or other frequencies. Access network 204 may also include many wireless stations for linking communication devices to access network 204. For example, a wireless station (e.g., gNB) may have a wireless link to an FWA device in customer premises 104, such as FWA 108. Access network 204 may direct the traffic from customer premises 104 through core network 206 and vice versa.

Core network 206 may include one or more types of networks, such as a LAN, a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of IP services to customer premises 104 and may interface with other networks, such as data network 208.

Depending on the implementation, core network 206 may include 5G core network components (e.g., a User Plane Function (UPF), an Application Function (AF), an Access and Mobility Function (AMF), a Session Management Function (SMF), a Unified Data Management (UDM) function, a Unified Data Repository (UDR), a Network Slice Selection Function (NSSF), a Policy Control Function (PCF), etc.), 4G or LTE core network components (e.g., a Serving Gateway (SGW), a Packet data network Gateway (PGW), a Mobility Management Entity (MME), etc.) or another type of core network components.

As further shown, core network 206 may include network slices 210 and a URSP management system 212. Although network slices 210 are illustrated as being within core network 206, some of the components of a network slice 210 may be implemented within access network 204 and/or data network 208. Access network 204, core network 206, and data network 208 may include multiple instances of network slices 210 and URSP management system 212.

Network slices 210 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QoS) class, a type of service, and/or a particular group of enterprise customers associated with FWAs and/or mobile communication devices.

URSP Management System (URSP MS) 212 may include components for managing URSPs. For example, URSP MS 212 may receive a request for a URSP, an update to the URSP, a TD, a token, a mapped token, mapped MAC addresses, application descriptions, application IDs, etc. The request may be from a network component in core network 206, access network 204, data network 208, and/or customer premises 104. In another example, URSP MS 212 may receive new URSPs from a network operator or a network component. In these cases, URSP MS 212 may prepare an updated URSP (e.g., based on the request) or the new URSP for distribution to other devices, such as FWA 108 in customer premises 104.

In some implementations, a request for URSP or the URSP-related information may include, for example, identifiers that are associated with client applications (e.g., application IDs, descriptions of applications, etc.). In response, URSP MS 212 may obtain information that comprises a network slice for servicing the client application, a TD that may be used to select the network slice, a mapped MAC address, a mapped token, etc. Furthermore, URSP MS 212 send the information to the network component or the FWA 108.

Data network 208 may include networks that are external to core network 206. In some implementations, data network 208 may include packet data networks, such as an Internet Protocol (IP) network.

For clarity, FIG. 2 does not show all components that may be included in network environment 200 (e.g., routers, bridges, wireless access point, additional networks, additional customer premises. etc.). Depending on the implementation, network environment 200 may include additional, fewer, different, or a different arrangement of components than those illustrated in FIG. 2. Furthermore, in different implementations, the configuration of network environment 200 may be different.

Figure 3:
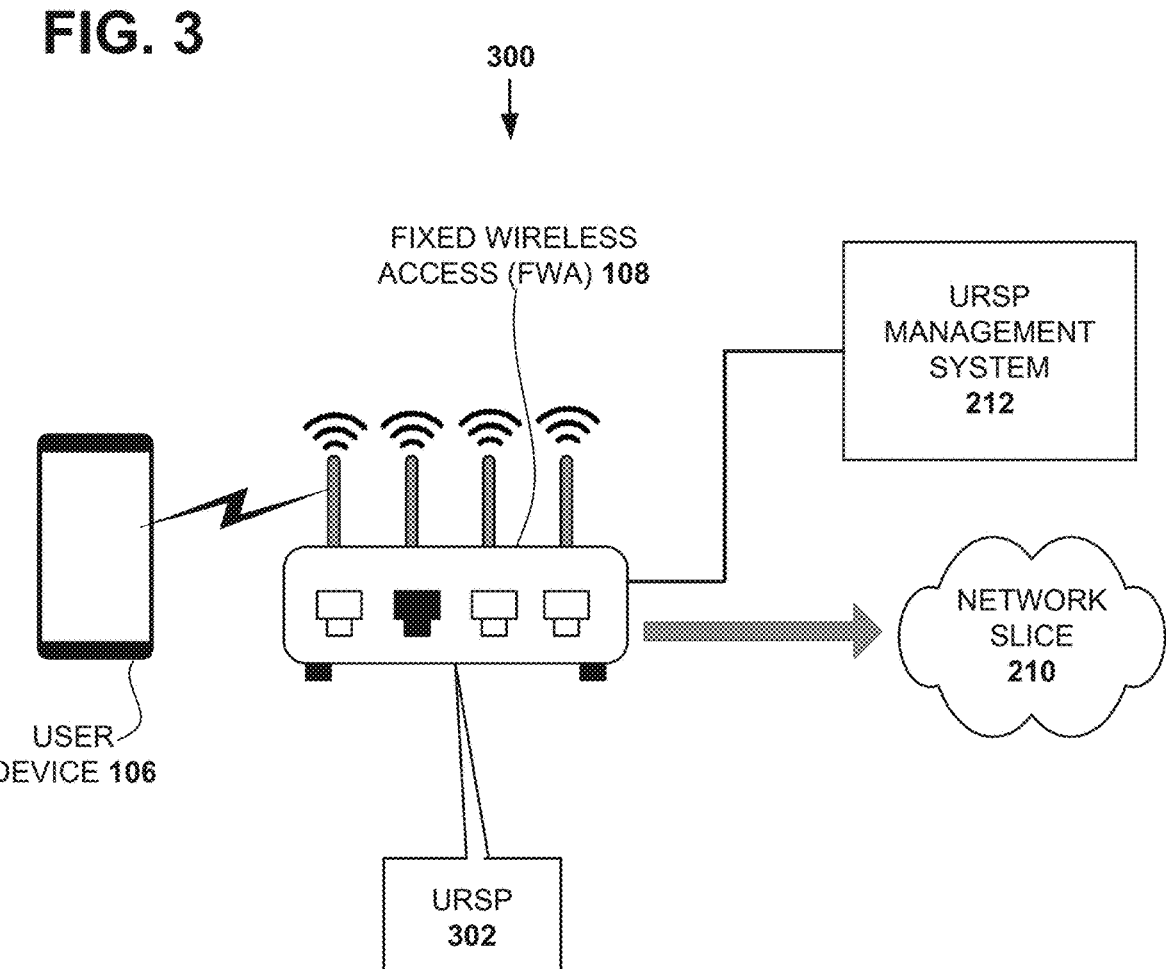
FIG. 3 illustrates exemplary elements of the system for User Equipment (UE) Route Selection Policy (URSP)-based tunneling through a Fixed Wireless Access device (FWA)

FIG. 3 illustrates exemplary elements of the system 300 for URSP-based tunneling through FWA 108. As shown, the system 300 includes a user device 106, FWA 108 which in turn includes a URSP 302, network slices 210, and URSP MS 212. Depending on the implementation, the system may include different set of network components than those illustrated in FIG. 3.

Depending on the implementation, FWA 108 may perform URSP-based tunneling for device 106 based on either the MAC address of device 106 or tokens associated with applications on device 106. For example, in one implementation, when FWA 108 receives packets from device 106, FWA 108 may obtain the MAC address associated with each packet (e.g., by extracting the MAC address from the Ethernet frame underlying the packets) and use the MAC address to forward the packets in accordance with the URSP 302. These frames may have been sent from/through the communications interface of devices 106 (e.g., a dongle, an Ethernet adapter, etc.) that provides mechanisms for sending data over Ethernet frames.

In a different implementation, when device 106 sends packets to FWA 108 for URSP-based tunneling, device 106 may also send tokens that are associated with applications on device 106. FWA 108 may use the tokens and the URSP to identify the network slices to which the data are to be forwarded and forwards the data to the identified network slices.

As described above, FWA 108 may use either a MAC address or a token to perform URSP-based tunneling of the packet. The URSP-based tunneling entails obtaining traffic descriptors (TDs) and using the TDs to identify what is known as a Routing Rule and to select a Route Selection Descriptor (RSD). The selected RSD identifies the network slice to which the packet is to be forwarded. FWA 108 may then forward the packet to the network slice. For example, in one implementation, assuming the packets are IPv6 packets, FWA 108 may rewrite the destination addresses of the packets to indicate the network slice to which the packets are to be directed. In a different implementation, FWA 108 may place the network slice identifier in the encapsulation header for the tunneling established from FWA 108 to another device in access network 204, core network 206, and/or data network 208.

Figure 4:
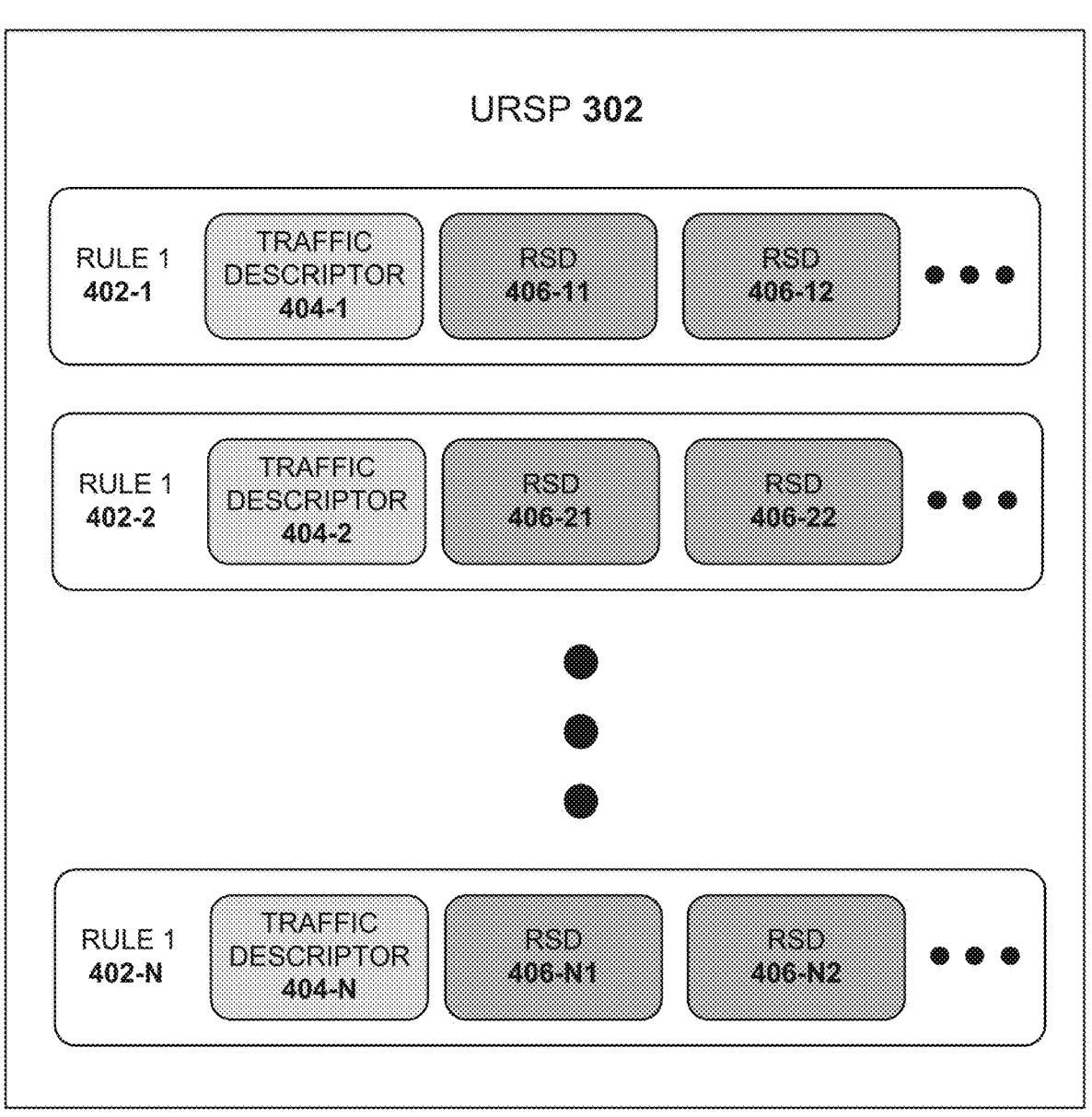
FIG. 4 shows components of a URSP according to an embodiment.

FIG. 4 shows an exemplary arrangement of routing rules and Route Selection Descriptors (RSDs) within URSP 302 according to an implementation. As shown, URSP 302 includes a series of routing rules 402-1 through 402-N (also referred to as rules 402), arranged in the order of their precedence. Thus, for example, when applying URSP 302, FWA 108 would attempt to match parameters of a packet to rule 402-1 before rule 402-2, attempt to match the parameters to rule 402-2 before rule 402-3, and so on. Each rule 402 is associated with a precedence value such that the highest precedence is associated with the lowest precedence value (i.e., a high value indicates lower priority). The last rule 402-N is the default rule.

As further shown, rule 402-1 includes a traffic descriptor (TD) 404-1 and series of route selection descriptors (RSDs) 406-11 through 406-1M (not shown). Other rules 402-2 through 402-N also include TDs 404 and RSDs 406, arranged in a manner similar to rule 402-1. Each instance of TD 404-1, 404-2 . . . 104-N (herein collectively referred to as TDs 404 and generically referred to as TD 404) may be different or same as another TD 404. Each instance of RSD 406 may be different or same as another RSD 406.

FIG. 5A shows exemplary components of device 106 and FWA 108 according to an implementation. In this implementation, FWA 108-1 may use the MAC address of the Ethernet frame underlying a packet from device 106 to perform URSP-based tunneling of the packet to network slice 210. As shown, device 106-1 includes an application 500-1 and an Ethernet adapter. FWA 108-1 includes a registrar MAC 502-1, a URSP client MAC 504-1, and a URSP MAC 302-1. In some embodiments, device 106-1 and FWA 108-1 may each include additional, fewer, and/or different components than those illustrated in FIG. 5A.

Application 500-1 may include software that interacts with an application on network slice 210. Depending on the implementation, application 500-1 may be dedicated software or firmware of device 106-1 (e.g., application for playing video content on a smart television (TV)). Ethernet adapter 501-1 may include a communication interface for receiving and/or transmitting Ethernet frames. Ethernet adapter 501-1 may include hardware/software with a mapped MAC address that is associated with a TD. If device 106-1 is not wirelessly connected to FWA 108-1 through Ethernet adapter 501-1 but attached to an Ethernet port of FWA 108-1 through a cable or wire, the Ethernet frame from device 106-1 to FWA 108-1 would carry the same destination MAC address as the mapped MAC address of the port.

Registrar MAC 502-1 may register devices 106 at FWA 108-1 when devices 106-1 send traffic to FWA 108. At the registration, registrar MAC 502-1 may look up the mapped MAC address of the incoming packet and store an indication that the mapped MAC address is in use. Similarly, if a device 106-1 that is connected to one of FWA 108-1's Ethernet ports sends a packet to FWA 108-1, FWA 108-1 may register the mapped MAC address of the port, indicating that the MAC address of the port is in use. In some situations, registrar MAC 502-1 may not have a complete set of the mapped MAC addresses. Thus, from time to time, registrar MAC 502-1 may attempt to message URSP MS 212 to obtain the complete set.

URSP client MAC 504-1 may receive, after the registration of device 106-1 and/or its Ethernet ports, packets from device 106-1 and forward the packets to the appropriate network slices 210. To perform URSP route selection, URSP client MAC 504-1 may, for each of the packets, obtain the MAC address for the packet (e.g., by looking up the source MAC address field of the Ethernet frame or by looking up the destination MAC address field), perform a lookup of a TD (and therefore the traffic type) corresponding to the MAC address in a database (e.g., a MAC-address-to-TD database). In other words, the packet may be classified to a traffic type identified by the TD. TO map the traffic/TD to a network slice, URSP client MAC 504-1 may then use the TD to select a routing rule 402. Having selected the routing rule 402, URSP client MAC 504-1 may then use any additional parameters to find a matching RSD 406 and thus identify the network slice 210 to which the packet is to be directed.

Depending on the implementation, URSP client MAC 504-1 may direct the packet to the identified network slice by having the connected modem send the packet to the identified network slice 210. In the implementation where access network 204, core network 206, and data network 208 handle an IPv6 packet format that includes a field for a Single-Network Slice Selection Assistance Information (S-NSSAI), URSP client MAC 504-1 may modify the header of the IPv6 packet to include the S-NSSAI of the network slice 210. Once the packet reaches network 102, the components of access network 204, core network 206, and data network 208 may perform the routing of the packet based on the S-NSSAI specified in the IPV6 header. In a different implementation where FWA 108-1 creates a tunnel to network 102, URSP client MAC 504-1 may insert the S-NSSAI in the encapsulating header of for the tunneled traffic.

URSP MAC 302-1 may include the URSP 302 that was received from URSP MS 2212. URSP MAC 302-1 may include rules 402 with a particular type of TDs 404. These are referred to as Non-IP Descriptors. URSP MAC 302-1 may be stored in the non-volatile (NV) memory/storage within FWA 108-1. URSP client MAC 504-1 may access URSP MAC 302-1 in the storage and locate the routing rule 402 by matching it against the TD (Non-IP Descriptor) for the mapped MAC address of the packet. URSP client MAC 504-1 may apply the routing rule 404 to information about the packet to identify a network slice and forward the packet to the network slice.

FIG. 5B shows exemplary components of device 106 and FWA 108 according to a different implementation. In FIG. 5B, FWA 108-2 may use tokens that accompany packets from device 106-2 to perform URSP-based tunneling of the packets to network slice 210. As shown, device 106-2 may include an application 500-2 and a software development kit (SDK) 501-2. FWA 108-2 may include a registrar token (TK) 502-2, a URSP client TK 504-2, and a URSP TK

302-2. In some embodiments, device 106-2 and FWA 108-2 may each include additional, fewer, and/or different components than those illustrated in FIG. 5B.

Application 500-2 may include software that interacts with an application of network slice 210. SDK 501-2 may include a software component responsible for sending a mapped token and packets from application 500-2 to FWA 108-2. The token is associated with application 500-2. SDK 501-2 may have been downloaded from network 102 or have been installed by another device or a human operator. Device 106-2 may include multiple SDKs 501-2 if there are multiple application 500-2 on device 106-2. Alternatively, device 106-2 may include a single instance of SDK 501-2 that performs token-related and communication related activities for multiple applications 500-2 on device 106-2.

Depending on the implementation, SDK 501-1 may or may not include a registrant application. For example, if SDK 501-2 is in possession of the mapped token for application 500-2 and the token is already known to FWA 108-2 (e.g., URSP client TK 504-2), SDK 501-2 may not register with FWA 108-2 and may not include a registrant program.

An SDK 501-2 that is implemented to deal with use-cases where SDK 501-2 does not have a token for application 500-2 may include a registrant program. In these implementations, the registrant may register with FWA 108-2 to obtain a mapped token corresponding to application 500-2 from FWA 108-2 and/or URSP MS 212. During the registration, SDK 501-2, FWA 108-2, and/or URSP MS 212 may follow a security protocol to render the forwarding of the application information to and receipt of the token from FWA 108-2 and/or the URSP MS 212 secure. In some embodiments where SDK 501-2 may generate mapped tokens for application 500-2. SDK 501-2 may send a registration request to FWA 108-2 along with the newly generated token and the application information.

Registrar TK 502-2 may accept requests to registration from SDK 501-2. If the registration request does not include a mapped token, registrar TK 502-2 may select or generate a mapped token based on the application information provided in the request and forward the token to SDK 501-2. Thereafter, when SDK 501-2 sends requests for sessions from application 500-2 to FWA 108-2, SDK 501-2 may send the token along with the request.

In some situations, when registrar TK 502-2 is requested to provide the token for application 500-2 and is unable to do so based on the application information in the registration request, registrar TK 502-2 may request URSP MS 212 for the token or for information needed to generate the token. The request may include the application information. Thereafter, registrar 502-2 may receive either the mapped token or the needed information for identifying/generating the token from URSP MS 212.

During the registration, for each mapped token that registrar TK 502-2 obtains (e.g., a token received from URSP MS 212, a token selected based in the application information, a token generated at registrar TK 502-2, or a token provided in the registration request, etc.), registrar TK 502-2 may identify a TD which is associated with a routing rule 402 for selecting the network slice for servicing the application 500-2 on device 106-2. After identifying the TD, registrar TK 502-2 may map the token to the TD. In some implementations, the association may also be made to the application information. Registrar TK 502-2 may store the association in a database.

URSP client TK 504-2 (also herein referred to as an App-Slice Mapping engine) may receive a message along with a token from device 106-2. Based on the message and the token, URSP client TK 504-2 may associate the flow (identified by the message or packets) with a traffic type identified by one of the TDs. When URSP client TK 504-2 receives packets of the flow, URSP client TK 504-2 TK classifies, based on the flow to which the packets belong, the packets to the traffic type identified by the TD and directs the packets to the network slice to which the TD is mapped.

URSP TK 302-2 may include the URSP 302 that was received from URSP MS 2212. URSP TK 302-2 may include rules with a particular type of TDs mapped to the tokens. URSP TK 302-2 may be stored in the NV memory/storage within FWA 108-2.

Figure 5C:
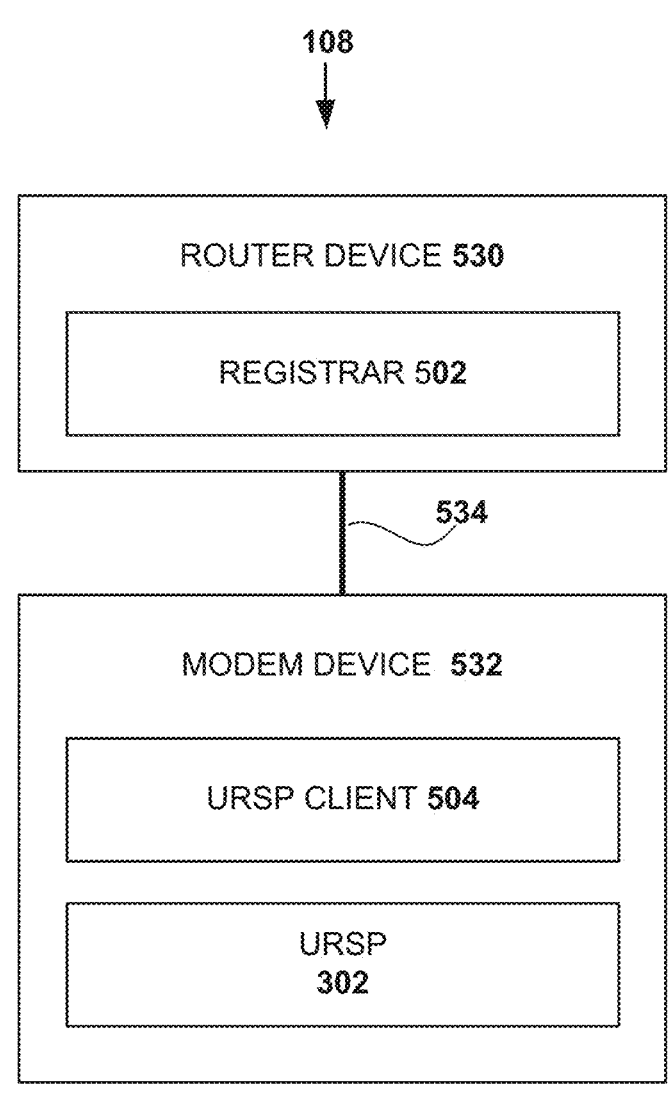
FIG. 5C shows exemplary components of an FWA device when a router and a modem of the FWA device are implemented on physically separate devices.

In FIGS. 5A and 5B, FWA 108 includes both the functionalities of a router and a modem. FIG. 5C shows components of FWA 108 when the router and the modem of FWA 108 are hosted on separate devices (e.g., router device 530 and modem device 532), with the modem device 532 having the ability to participate in directing packets/traffic from devices 106 to network slices 210. In such implementations, the router device 530 may include registrar 502 and a URSP client-A 504-4 and the modem device may include URSP client 504-5 and URSP 302. In these implementations, the URSP client-A 504-4 on router device 530 may hand off traffic/packets from devices 106 and the TDs associated with the packets to the URSP client-B 504-5 on modem device 532, through a router-modem interface 534. URSP client-B on modem device 532 may then redirect the traffic from URSP client-A 504-4 to appropriate network slices 210 by using the TDs and the URSP 302.

Figure 5D:
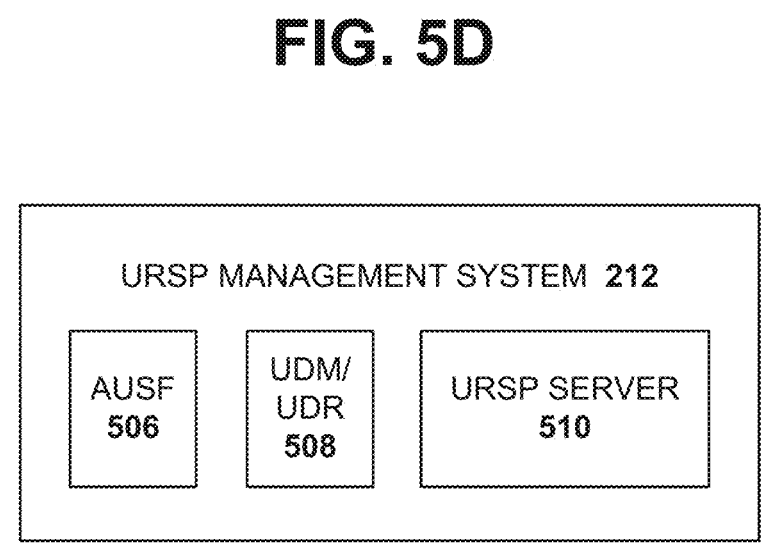

FIG. 5D shows exemplary components of URSP MS 212 according to an embodiment. As shown, URSP MS 212 may include an Authentication Server Function (AUSF) 506, a Unified Data Management (UDM) and a Unified Data Repository (UDR) 508, a URSP server 510. Of these components 506-510, AUSF 506 and UDM/UDR 508 are 5G core network components. In other implementations, URSP MS 212 may include additional or different network core components (e.g., a Policy Control Function (PCF), 4G core components such as Authentication Authorization and Accounting (AAA) and Home Subscriber Server (HSS) that correspond to AUSF 506 and UDM/UDR 508, etc.).

AUSF 506 may render authentication services and other security related services to other network components, such as UDM/UDR 508, and/or URSP server 510. UDM 508 may manage subscription information, handle user identification and authentication (together with AUSF 506) and perform access authorization for other network components. For example, URSP server 510 may request UDM 508 to determine whether a user or a device is authorized to use a particular application and/or to receive URSP-related information (e.g., a URSP 302, a TD 404, etc.). UDR 508 may store subscriber information and/or another type of information in non-volatile memory or storage.

URSP server 510 may provide a URSP 302, URSP-related information, and/or application related information to FWA 108. For example, FWA 108 may request information needed for registration of devices 106 and/or for URSP-based tunneling (e.g., MAC addresses, tokens, TDs, etc.). Depending on the implementation, the request may include application information (e.g., application ID or descriptions of the applications on devices 106). Upon receipt of the request, URSP server 510 may request UDM/UDR 508 to authenticate the user/customer that is associated with FWA 108, to determine whether FWA 108 is authorized to obtain information pertaining to the MAC addresses, tokens, and/or URSP-related information. If UDM/UDR 508 successfully authenticates the customer/user and indicates that the customer/user is authorized receive the information, URSP server 510 may forward information which pertains to the MAC addresses, tokens, and/or the latest URSP.

Figure 6:
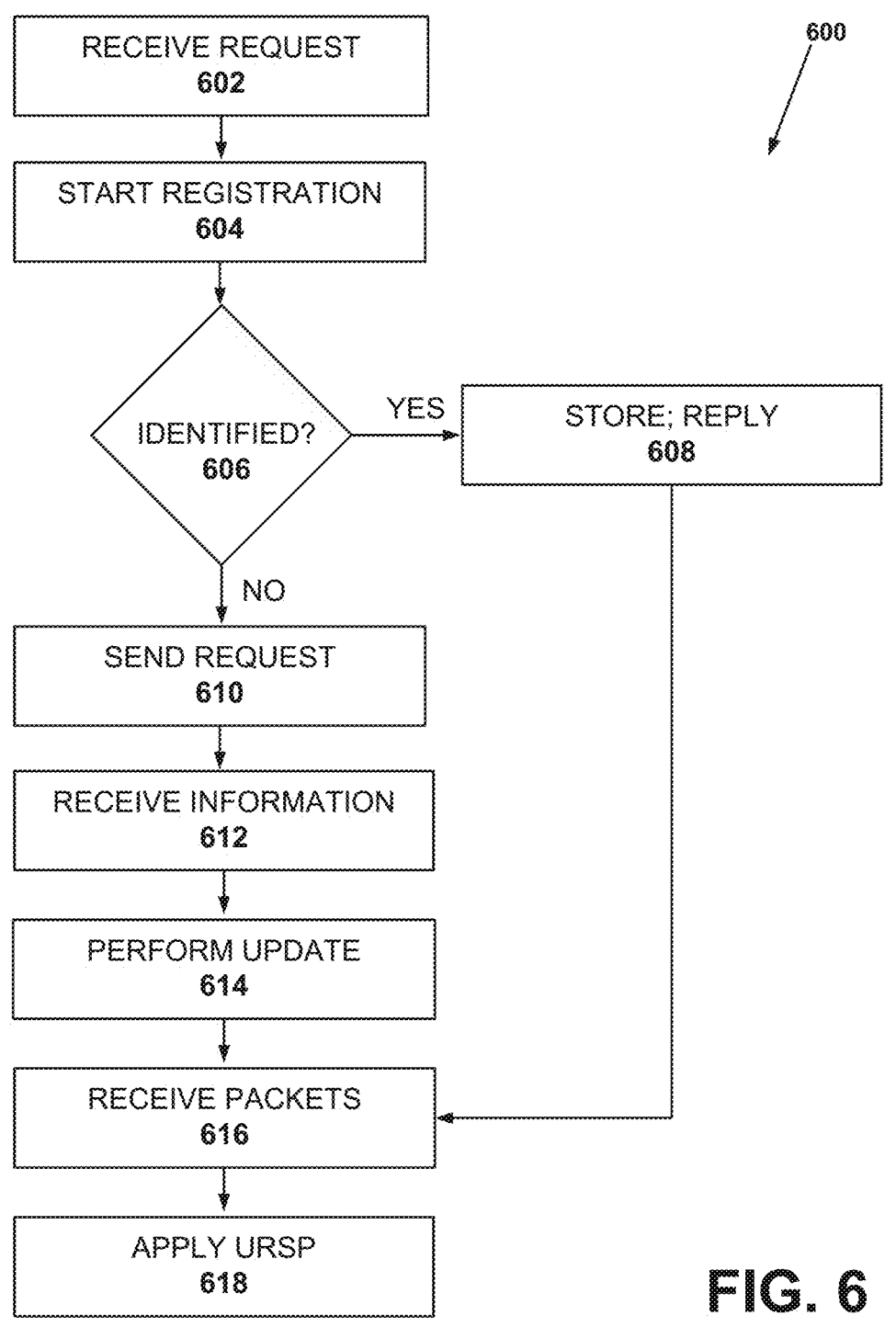
FIG. 6 is a flow diagram for an exemplary process that is associated with URSP-based tunneling through an FWA device according to different implementations.
Figure 7:
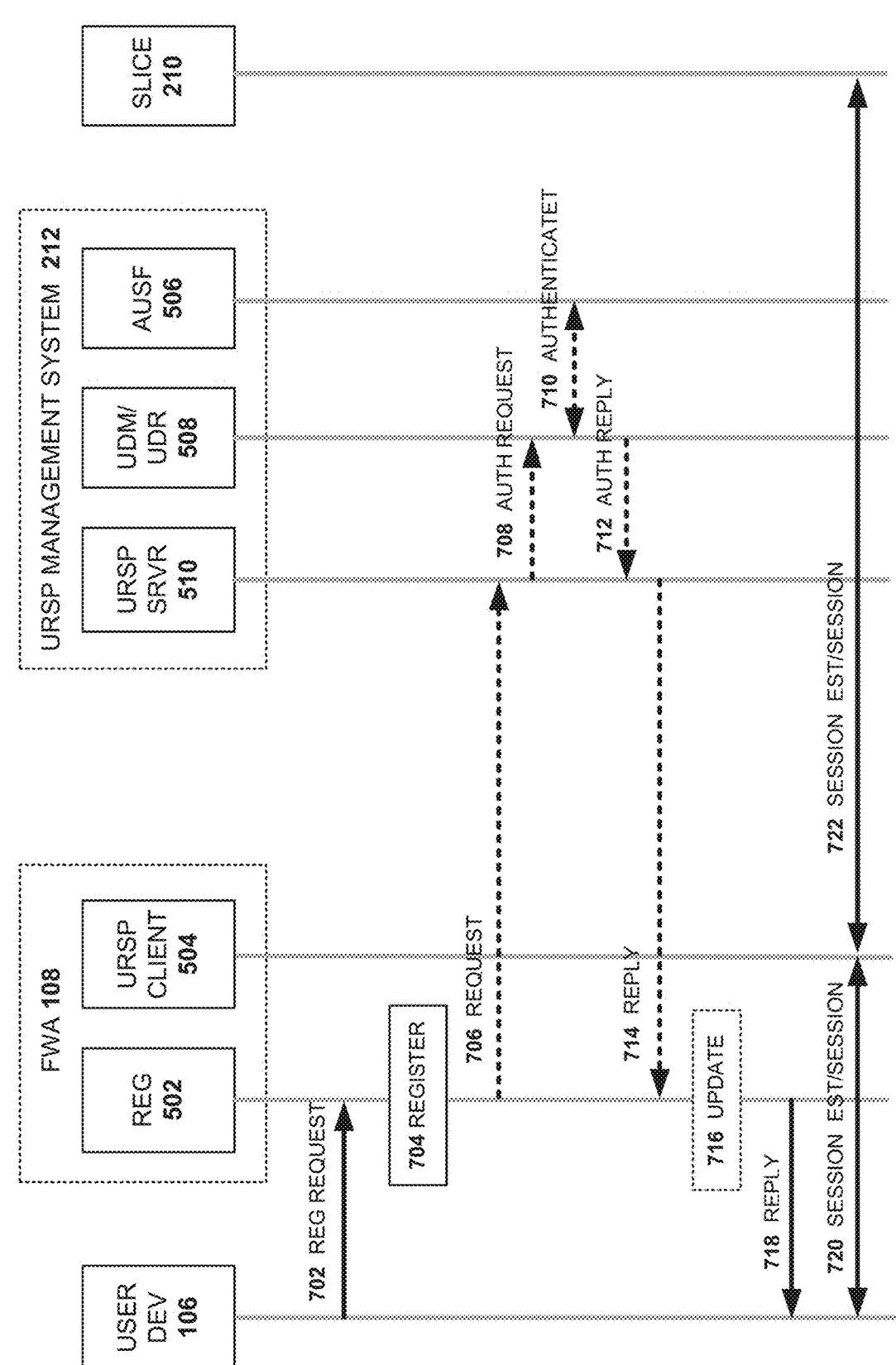
FIG. 7 is a signal flow diagram that is associated with URSP-based tunneling through an FWA, according to different implementations.

FIG. 6 is a flow diagram for an exemplary process 600 that is associated with URSP-based tunneling through an FWA 108 according to different implementations. During process 600, components of network 102, FWA 108, and devices 106 may send messages or signals to one another. These messages/signals are shown in FIG. 7, which is a signal flow diagram that is associated with URSP-based tunneling through FWA 108. Process 600 may be performed by network components shown in FIG. 7, such as user device 106, FWA 108, and URSP MS 212. Although additional network components may perform part of process 600, these components are not shown in FIG. 7. FIG. 7 is not intended illustrate every signal/message or tasks performed by the network components during process 600.

In some implementations, process 600 may include FWA 108 receiving a request to register from device 106 (block 602; arrow 702). In one implementation, any packet sent from device 106-1 to FWA 108-1 may serve as a registration request to registrar MAC 501-1. In a different implementation, registrar 502-2 in FWA 108-2 may receive a request for registration when SDK 501-1 either does not have a token for application 500-2 or has just generated a new token, for application 500-2, which registrar TK 502-2 is not aware of.

In response, FWA 108 may determine whether it has the information necessary to perform the registration (block 604; block 704). For example, FWA 108-1 may determine whether it has a complete set of mapped MAC addresses for devices 106 and its Ethernet ports. In another example, FWA 108-2 may determine whether it can recognize the token sent in the registration request or is can generate a new token for application 500-1 based on the application information.

If FWA 108 has the information (block 604: YES), FWA 108 may perform the registration (block 606) and store the indication that the registration has been performed. For example, if FWA 108-1 has the complete set of mapped MAC addresses, FWA 108-1 may perform the registration and store the indication that the MAC address is in use. Similarly, if FWA 108-2 is able to generate a new token for SDK 501-2 or recognizes the token sent from SDK 501-2 in the request for registration, SDK 501-2 may perform the registration and record the indication that the token is in use. Process 600 may proceed to block 614.

If FWA 1108 does not have the information to perform the registration (block 604: NO), registrar 502 may send a request for the information to URSP MS 212 (block 608; arrow 706). For example, if FWA 108-1 does not have a complete set of mapped MAC addresses assigned to the Ethernet adapters for devices 106-1 and the Ethernet ports of FWA 108-1, FWA 108-1 may send a request for mapped MAC addresses that FWA 108-1 does not have to URSP MS 212. In another example, if FWA 108-2 is unable to generate a mapped token or the token received from SDK 501-2 is not identifiable by FWA 108-2, FWA 108-2 may send a request to URSP MS 212 for the new token, information that it can use to generate a new token, and/or information that enables FWA 108-2 to map the token to a TD.

When URSP MS 212 receives the request, URSP SRVR 510 on URSP MS 212 initiates an authentication of the customer/user at UDM/UDR 508 (arrow 708). UDM/UDR 508 then further exchanges messages with AUSF 506 to complete the authentication (arrow 710). UDM/UDR 508 then forwards the result of authentication to URSP SRVR 510 (arrow 712). Assuming the authentication is successful, URSP SRVR 510 may send the requested information to FWA 108 in a reply (arrow 714). Depending on the implementation, the information may include, for example, mapped MAC addresses, a new token, information that may enable FWA 108-2 to generate a new token, a TD associated with the new token, and/or an updated URSP.

Process 600 may further include receiving the requested information from URSP MS 212 (block 610; arrow 714). Furthermore, upon receipt of the information, FWA 108 may perform any local updates, such as updates to its set of mapped MAC addresses, TDs, tokens, the URSP, and/or any other information needed to perform the registration (block 612; block 716). In some implementations, FWA 108 may then send a reply to the registration request from device 106 (block 614; arrow 718). The reply, for example, may include a token and/or information needed by SDK 501-2 to generate a token for application 500-2 on device 106-2.

After acts that are associated with blocks 602-612 are complete, device 106 may establish a session with network 102 (block 614; arrows 720 and 722) via FWA 108. After the establishment of the session, FWA 108 may receive packets from device 106 (block 614; arrow 720). For example, FWA 108-1 may receive packets over Ethernet frames. Upon receipt of the packets, FWA 108-1 (e.g., URSP client MAC 502-1) may obtain the MAC address of the Ethernet frames and use the MAC address to identify the TD. Furthermore, using the TD and other session parameters, FWA 108-1 may direct the packets to the network slice 210 identified by the routing rule 402 in URSP MAC 302-1 (arrow 722). That is, FWA 108 may apply the URSP 302 to the received packets (block 616).

In another example, FWA 108-2 may receive packets from device 106-2 along with a token associated with the application 500-2. Upon receipt of the packets, FWA 108-2 may obtain the token and use the token to identify the TD. Furthermore, using the TD and other session parameters, FWA 108-2 may direct the packets to the network slice identified by the routing rule in URSP TK 302-2 (arrow 722). That is, FWA 108-2 may apply the URSP 302 (block 616).

Figure 8A:
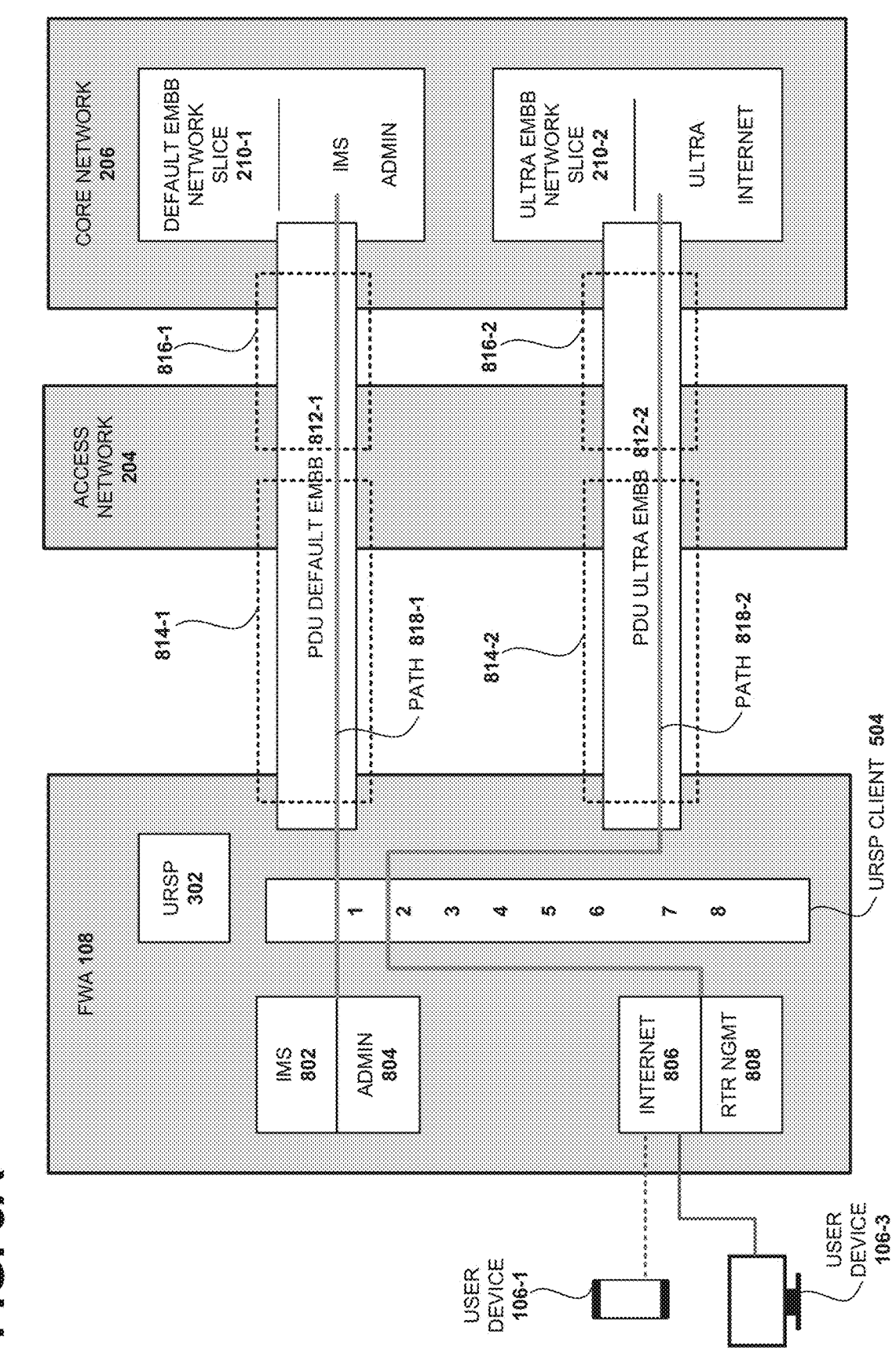

FIGS. 8A-8D illustrate selecting, by an FWA 108, routes for different network traffic types, according to different implementations. FIG. 8A shows FWA 108 routing network traffic from different sources to two different network slices. In FIG. 8A, FWA 108 has the ability to categorize PDUs from different UEs 106-1 and 106-3 and from other sources. As a result of categorization, PDUs that are received from UEs 106 and other sources become associated with (or bear the indications of) one of four different types of traffic: IMS traffic 802, administrative (admin) traffic 804, Internet traffic 806, and router management traffic 808.

IMS traffic 802 may include PDUs related to Internet Multimedia Subsystem PDUS, such as Voice-over-IP (VoIP) data, video data, and/or another type of multimedia information associated with IMS services. Admin traffic 804 may include traffic that is associated with management of FWA 108 or other devices that FWA 108 manages. For example, admin traffic 804 may include diagnostic data, version information related to software installed at FWA 108 and/or other devices, monitoring information, etc. Internet traffic 806 may include traffic from UEs 106 to/from the Internet. Router management traffic 808 may include traffic that is associated with the router function within FWA 108 or another device. In some implementations, route management traffic 808 may include control plane information (e.g., information for populating a outing information base (RIB)

or a forwarding information base (FIB), etc.) associated with the router function of FWA 108.

Traffic that FWA 108 obtains from UEs 106 may be classified by the router function in FWA 108 as IMS traffic 802, admin traffic 804, Internet traffic 806, or router management traffic 808. For example, FWA 108 may classify the traffic from UEs 16-1 and UE 106-3 as the Internet traffic 806 based on the MAC addresses of the Ethernet frames. In a different implementation, FWA 108 may mark the traffic from UEs 106-1 and 106-3 based on tokens that are associated with applications on the UEs. In some implementations, the router function in FWA 108 may not classify the traffic, as the PDUs may already include information that indicates the traffic type.

When URSP client 504 receives the traffic through the router function within FWA 108, URSP client 504 may apply URSP 302 to the traffic, sending IMS traffic 802 and admin traffic 804 to a default enhanced mobile broadband (eMBB or EMBB) network slice 210-1 and sending internet traffic 806 and router management traffic 808 to an ultra-high performance (ultra) EMBB network slice 210-2.

To send IMS traffic 802 and admin traffic 804 to default network slice 210-1, URSP client 504 establishes a PDU default EMBB tunnel 812-1 from FWA 108 to network slice 210-1 over a wireless communication channel 814-1 (between FWA 108 and access network 204) and a backhaul channel 816-1 (between access network 204 and core network 206). Data path 818-1 may extend from source devices (not shown) to network slice 210-1 through tunnel 812-1.

To send Internet traffic 806 and router management traffic 808 to ultra EMBB network slice 210-2 (e.g., a network slice having an ultra-wide bandwidth and/or ultra-low latency), URSP client 504 may establish a PDU ultra EMBB tunnel 812-2 from FWA 108 to network slice 210-2 over a wireless communication channel 814-2 (between FWA 108 and access network 204) and a backhaul channel 816-2 (between access network 204 and core network 206). Data path 818-2 may extend from source devices (e.g., UE 106-1 and UE 106-3) to network slice 210-2 through tunnel 812-2.

Figure 8B:
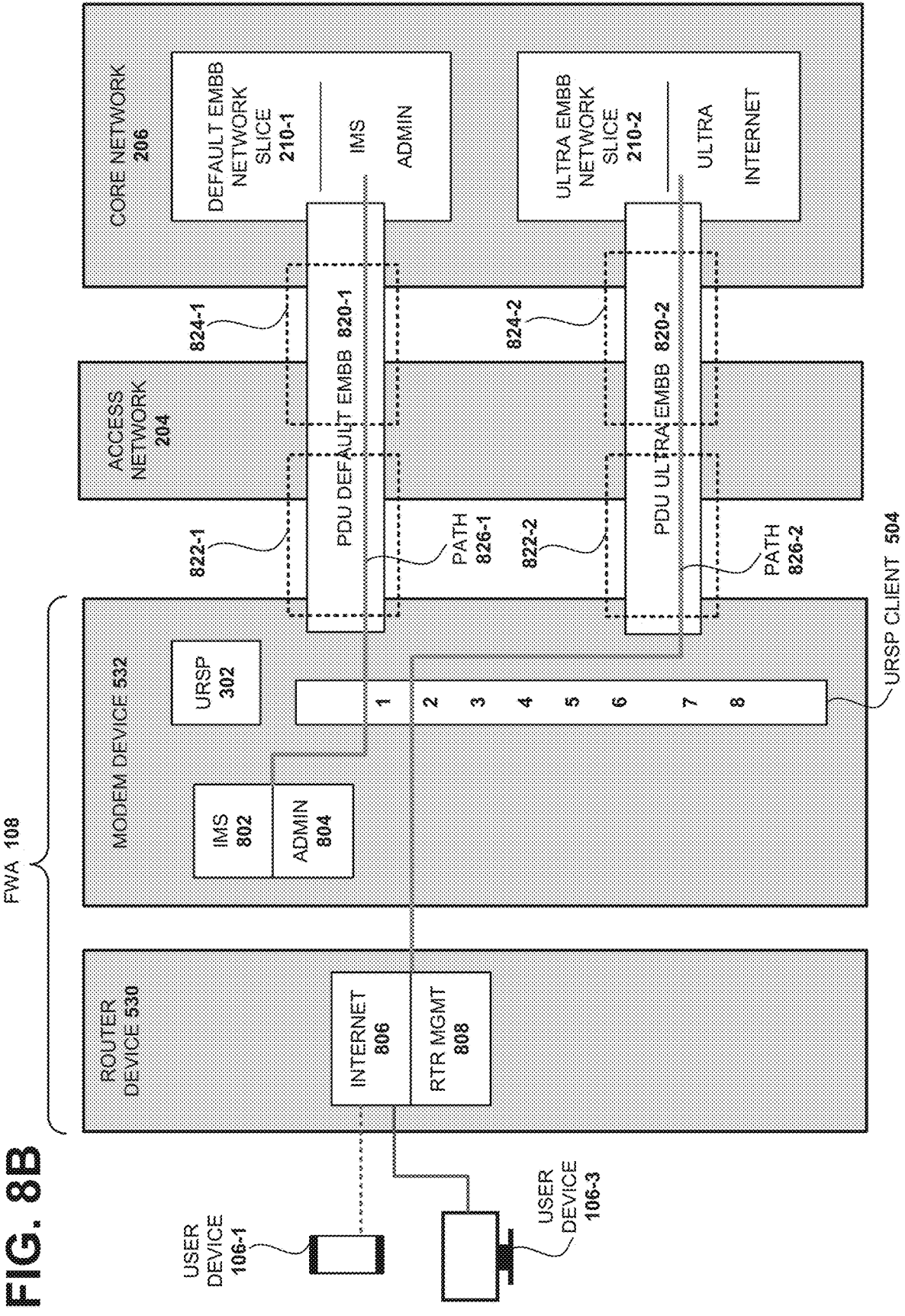

Similar to FIG. 8A, FIG. 8B also shows FWA 108 routing network traffic from different sources to two different network slices. However, in contrast to FWA 108 in FIG. 8A, FWA 108 in FIG. 8B is implemented as a combination of router device 530 and modem device 532. Router device 530 has the ability to categorize PDUs from UEs 106-1 and 106-3 and from other sources (not shown). As a result of categorization, PDUs that are received from UEs 106 and other sources become associated with (or bear the indications of) a type of traffic: Internet traffic 806 and router management traffic 808. Internet traffic 806 and router management traffic 808 are sent by router device 530 to modem device 532 over Ethernet frames. The Ethernet frames may indicate the type of traffic (e.g., source addresses or VLAN code) or the traffic descript for the traffic.

In FIG. 8B, IMS traffic 802 and admin traffic 804 are illustrated as originating in modem device 532. However, depending on the implementation, the traffic sources may reside outside modem device 532. Furthermore, although not shown, the traffic sources may include devices that forward their data via router device 530 or direct their data directly to modem device 532.

Traffic that FWA 108 receives from UEs 106 or other sources may be associated with traffic descriptors that indicate whether the traffic is IMS traffic 802, admin traffic 804, Internet traffic 806, or router management traffic 808. For example, router device 530 may classify the traffic from UE 106-1 and UE 106-3 as the Internet traffic 806 based on the MAC addresses of the Ethernet frames. In a different implementation, router device 530 may mark the traffic from UEs 106-1 and 106-3 based on tokens associated with application on the UEs. In some implementations, router device 530 may not classify the traffic, as the PDUs include information that indicates the traffic type or the traffic descriptor.

When modem device 532 receives the traffic from router device 530 or other sources (e.g., devices that sent IMS traffic 802 or admin traffic 804), URSP client 504 may apply URSP 302 to forward the traffic to appropriate network slices. For example, URSP client 504 may send IMS traffic 802 and admin traffic 804 to default network slice 210-1 and send internet traffic 806 and router management traffic 808 to network slice 210-2.

To send IMS traffic 802 and admin traffic 804 to default EMBB network slice 210-1, URSP client 504 may establish a PDU default EMBB tunnel 820-1 from modem device 532 to network slice 210-1 over a wireless communication channel 822-1 (between modem device 530 and access network 204) and a backhaul channel 824-1 (between access network 204 and core network 206). Data path 826-1 may extend from source devices (not shown) to network slice 210-1 through tunnel 820-1.

To send Internet traffic 806 and router management traffic 808 to an ultra EMBB network slice 210-2, URSP client 504 may establish a PDU ultra EMBB tunnel 812-2 from modem device 532 to network slice 210-2 over a wireless communication channel 822-2 (between FWA 108 and access network 204) and a backhaul channel 824-2 (between access network 204 and core network 206). Data path 816-2 may extend from source devices (e.g., UE 106-1 and UE 106-3) to network slice 210-2 through tunnel 812-2.

Figure 8C:
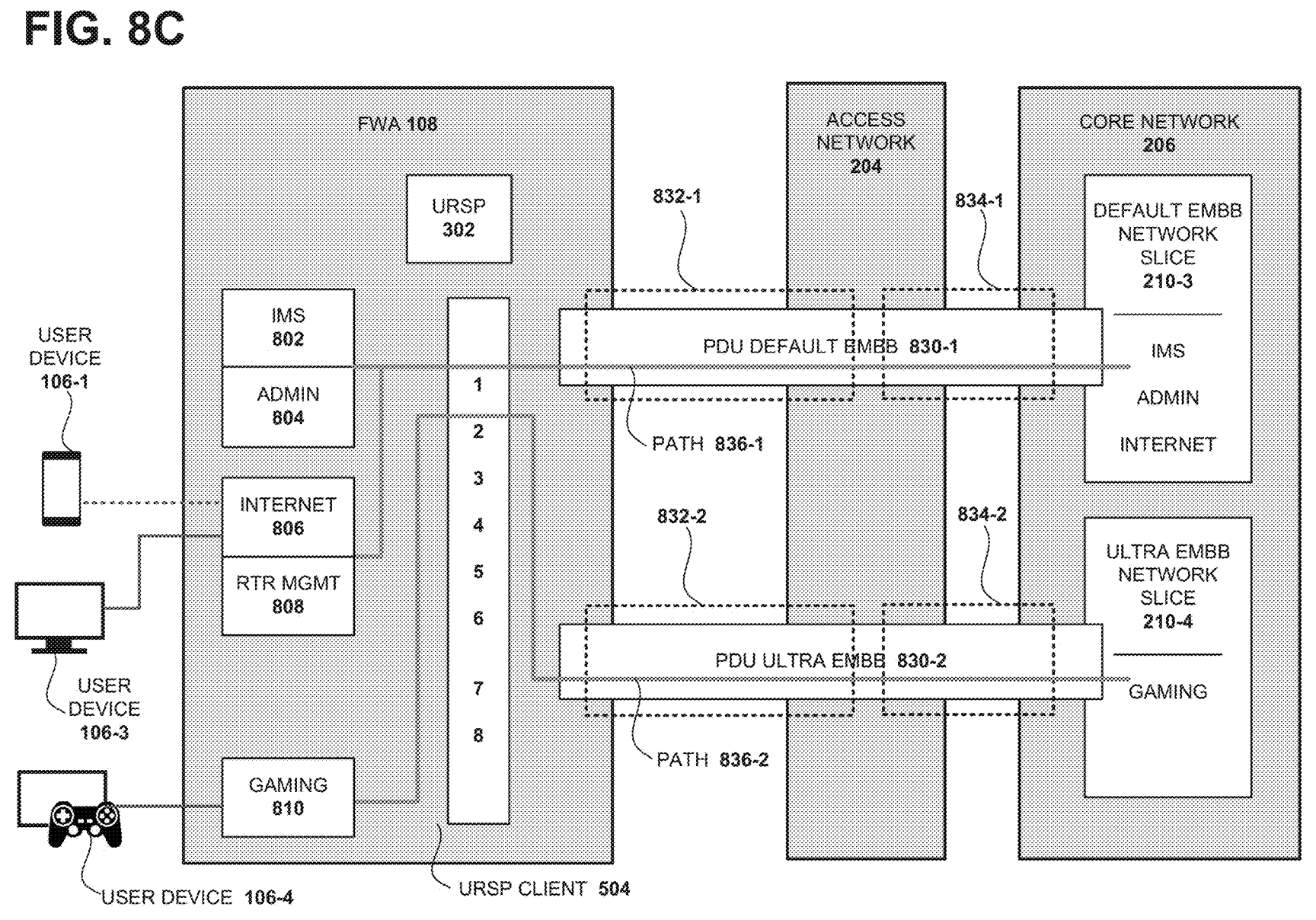

FIG. 8C shows FWA 108 routing network traffic from different sources to two different network slices according to another implementation. According to FIG. 8C, FWA 108 may categorize PDUs received from UEs 106 and other sources. As a result, the PDUs may become associated with (or bear the indications of) one of five different types of traffic: IMS traffic 802, admin traffic 804, Internet traffic 806, router management traffic 808, and gaming traffic 810. IMS traffic 802, admin traffic 804, Internet traffic 806, and router management traffic 808 have been described above with reference to FIG. 8A. Gaming traffic 810 may include traffic that is associated with various gaming platforms (e.g., PlayStation™ Xbox™ Twitch™, Amazon® Luna™, Steam®, etc.).

Traffic that FWA 108 obtains from UEs 106 may be classified by the router function in FWA 108 as IMS traffic 802, admin traffic 804, Internet traffic 806, router management traffic 808, or gaming traffic 810. For example, FWA 108 may classify the traffic from UE 106-4 as gaming traffic 810 and the traffic from UEs 16-1 and UE 106-3 as the Internet traffic 806 based on the MAC addresses of the Ethernet frames. In a different implementation, FWA 108 may mark the traffic from UEs 106-1, 106-3, and 106-4 based on tokens. In some implementations, FWA 108 may not classify the traffic, as the PDUs include information that indicates the traffic type.

When URSP client 504 receives the traffic through the router function within FWA 108, URSP client 504 may apply URSP 302 to the traffic. As a result, FWA 108 may send IMS traffic 802, admin traffic 804, Internet traffic 806, and router management traffic 808 to network slice 210-3; and send gaming traffic 810 to network slice 210-4.

To send IMS traffic 802, admin traffic 804, Internet traffic 806, and router management traffic 808 to default network slice 210-3, URSP client 504 may establish a PDU default EMBB tunnel 830-1 from FWA 108 to network slice 210-3 over a wireless communication channel 832-1 (between FWA 108 and access network 204) and a backhaul channel 834-1 (between access network 204 and core network 206). Data path 836-1 may extend from source devices to network slice 210-3 through tunnel 830-1.

To send gaming traffic 810 to an ultra EMBB network slice 210-4, URSP client 504 may establish a PDU ultra EMBB tunnel 830-2 from FWA 108 to network slice 210-4 over a wireless communication channel 832-2 (between FWA 108 and access network 204) and a backhaul channel 834-2 (between access network 204 and core network 206). Data path 836-2 may extend from source devices (e.g., UE 106-4) to network slice 210-4 through tunnel 830-2.

Figure 8D:
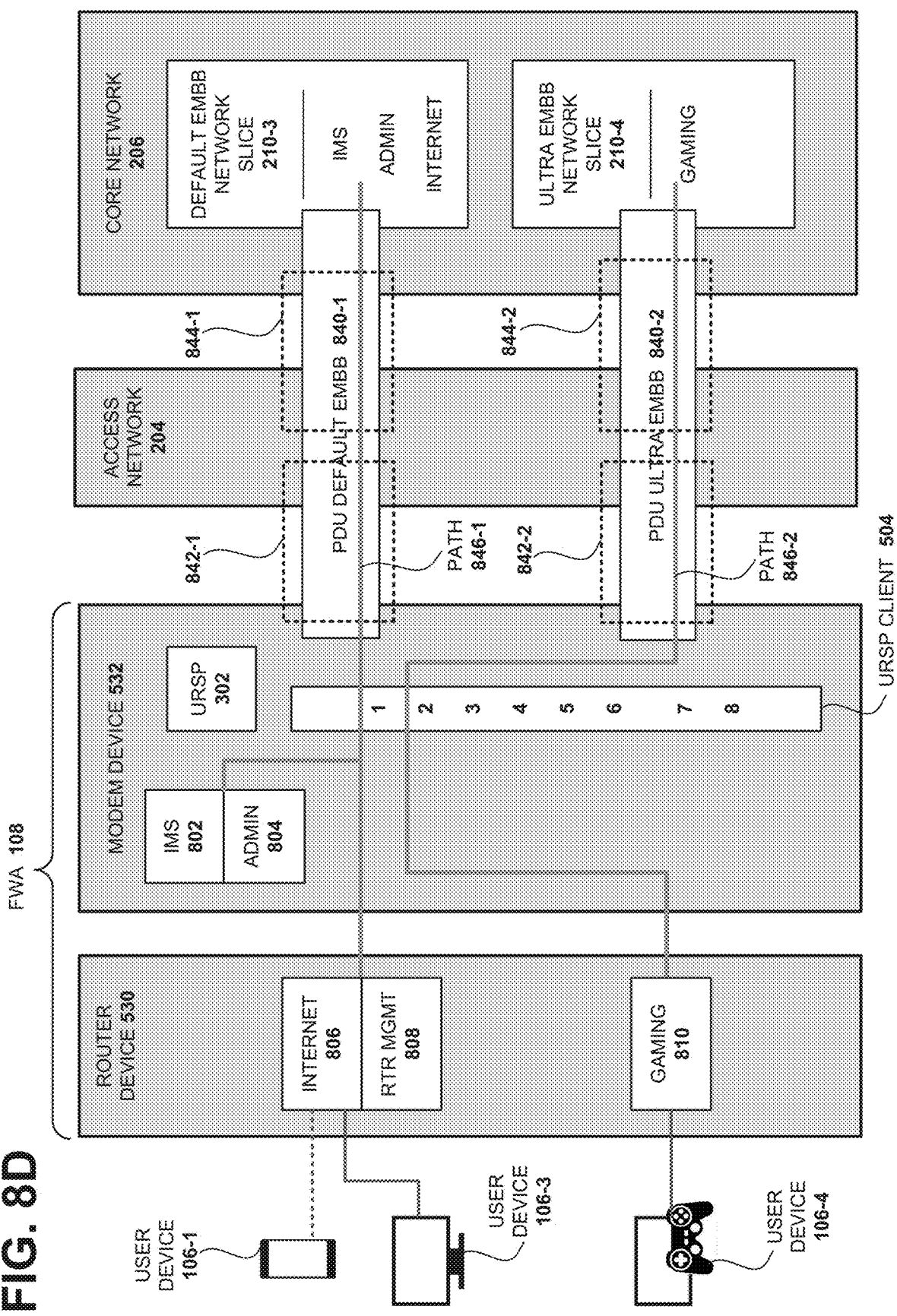

FIG. 8D shows FWA 108 routing network traffic from different sources to two different network slices according to yet another implementation. Similar to FWA 108 in FIG. 8B, FWA 108 in FIG. 8D comprises a combination of router device 530 and modem device 532. Router device 530 has the ability to categorize PDUs from different UEs 106-1, 106-3, 106-4 and from other sources (not shown). As a result of the categorization, PDUs that are received from UEs 106-1 and 106-3 and other sources become associated with (or bear the indications of) a type of traffic: Internet traffic 806, router management traffic 808, or gaming traffic 810. Internet traffic 806 and router management traffic 808 are forwarded by router device 530 to modem device 532 over Ethernet frames. The Ethernet frames may indicate the type of traffic (e.g., source addresses or VLAN code) or the traffic descriptor. In additions, PDUs that are received from UE 106-4 (and other sources) become associated with gaming. The gaming traffic 810 is forwarded by router device 530 to modem device 532 over Ethernet frames that indicate the gaming traffic type (e.g., source addresses or VLAN code) or the traffic descriptor.

In FIG. 8D, IMS traffic 802 and admin traffic 804 are illustrated as originating from within modem device 532. However, depending on the implementation, the traffic sources may reside outside modem device 532. Furthermore, although not shown, the traffic sources may include devices that forward their data via router 530 or directly to modem device 532.

Traffic that FWA 108 obtains from UEs 106 or other sources may be associated with traffic descriptors that indicate whether the traffic is IMS traffic 802, admin traffic 804, Internet traffic 806, router management traffic 808, or gaming traffic 810. For example, router device 530 may classify the traffic from UEs 16-1, UE 106-3, and UE 106-4 as the Internet traffic 806, router management traffic 808, or gaming traffic 810 based on the MAC addresses of the Ethernet frames. In a different implementation, router device 530 may mark the traffic from UEs 106-1, 106-3, and 106-4 based on tokens. In some implementations, router device 530 108 may not classify the traffic, as the PDUs include information that indicates the traffic type or the traffic descriptor.

When modem device 532 receives the traffic from router device 530 or other sources (e.g., devices that sent IMS traffic 802 or admin traffic 804), URSP client 504 may apply URSP 302 to the traffic. For example, URSP client 504 may send IMS traffic 802, admin traffic 804, Internet traffic 806, and router management traffic 808 to default EMBB network slice 210-3; and send gaming traffic 810 to ultra EMBB network slice 210-4.

To send IMS traffic 802, admin traffic 804, Internet traffic 806, and router management traffic 808 to default network slice 210-3, URSP client 504 may establish a PDU default EMBB tunnel 840-1 from modem device 532 to network slice 210-1 over a wireless communication channel 842-1 (between modem device 530 and access network 204) and a backhaul channel 844-1 (between access network 204 and core network 206). Data path 846-1 may extend from source devices to network slice 210-3 through tunnel 840-1.

To send gaming traffic 810 to ultra EMBB network slice 210-4, URSP client 504 establishes a PDU ultra EMBB tunnel 840-2 from modem device 532 to network slice 210-4 over a wireless communication channel 842-2 (between FWA 108 and access network 204) and a backhaul channel 844-2 (between access network 204 and core network 206). Data path 846-2 may extend from source devices (e.g., UE 106-4) to network slice 210-4 through tunnel 840-2.

FIG. 9 illustrates a table that summarizes different traffic descriptors (TDs) and route selection descriptors (RSDs) in URSP 302 for the use-cases of FIGS. 8A-8D. In particular, the use cases #1 through #4 in FIG. 9 correspond to FIGS. 8A-8D, respectively.

In FIG. 9, for use cases #1 and #2, two RSDs designate data network name (DNN) that corresponds to a default network slice for the following TDs: IMS and ADMIN. Two other RSDs designate ultra DNN, which corresponds to the ultra EMBB network slice for the following DSs: Internet and route management (RTR). For use cases #3 and #4, four RSDs designate the DNN corresponding to the default network slice for the following TDs: IMS, ADMIN, Internet, and RTR. One RSD designates the ultra DNN, which corresponds to the ultra EMBB network slice for the gaming TD.

Although FIG. 9 illustrates a summary of the RSDs and TDs in URSP 302 for the use cases of FIGS. 8A-8D, in other implementations, URSP 302 may include different RSDs and TDs for classifying traffic and tunneling the traffic to appropriate network slices. For example, the RSDs may specify additional network slices not shown in FIG. 9. In another example, TDs may specify traffic associated with not only with gaming, streaming, IMS, and route management but also traffic associated with enterprise customers (e.g., a customer assigned a high QoS), autonomous vehicles, IoTs, etc.

Figure 10:
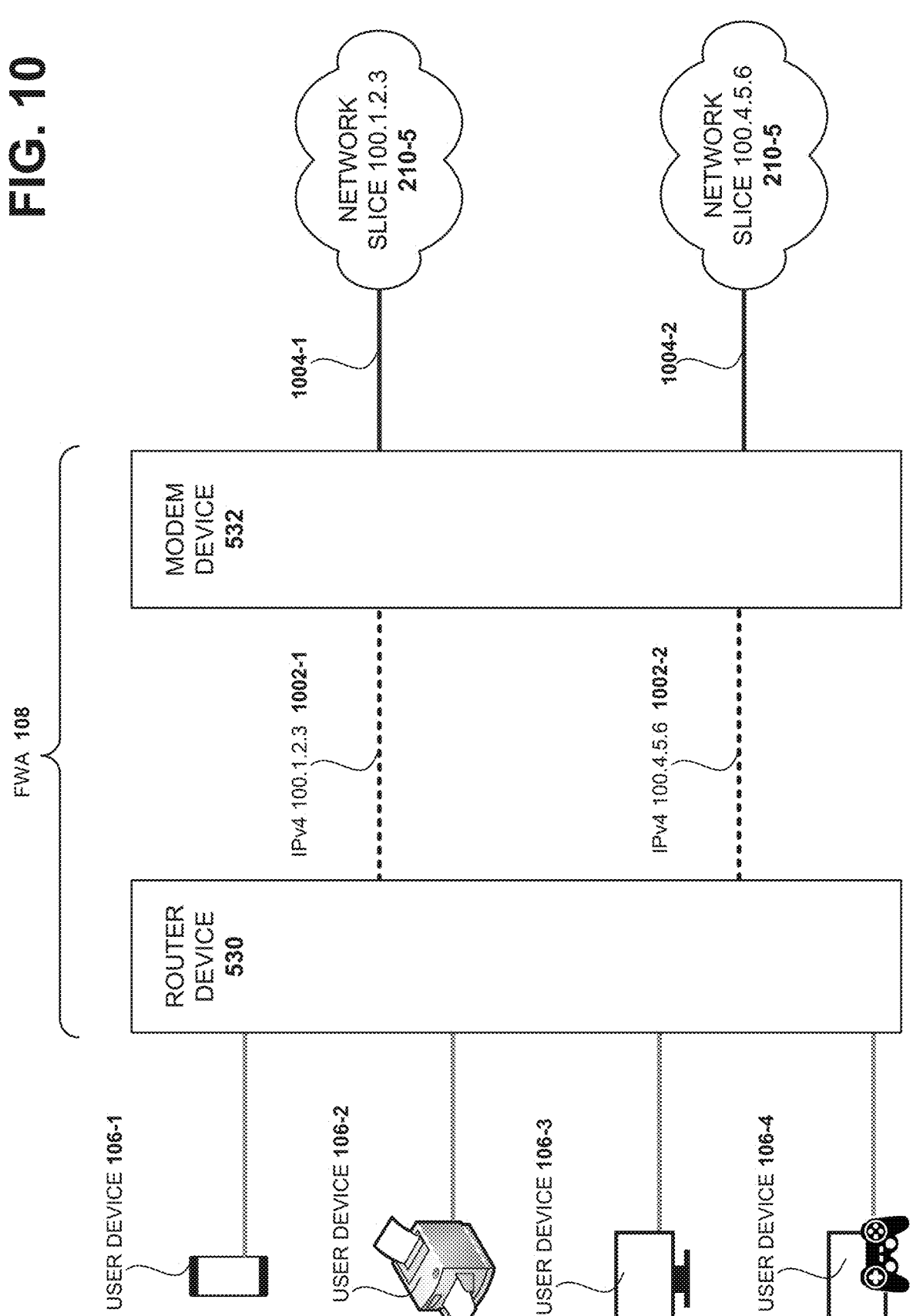
FIG. 10 illustrates example tunneling of traffic from an FWA, which is implemented as a combination of a router device and a modem device, to network slices with Internet Protocol version 4 (IPv4) addresses, according to an implementation.

FIG. 10 illustrates example tunneling of traffic from an FWA 108, which is implemented as a combination of router device 530 and modem device 532, to network slices with Internet Protocol version 4 (IPv4) addresses. In this implementation, router device 530 may classify the traffic from UEs 106-1 through 106-4 as either PDUs 1002-1 for a network slice 210-5 (with the IPv4 address of 100.1.2.3) or PDUs 1002-2 for a network slice 210-6 (with the IPv4 address of 100.4.5.6). In one implementation, PDUs 1002-1 and 1002-2 may be sent from router device 530 to modem device 532 over Ethernet frames. When modem device 532 receives PDUs 1002-1 and 1002-2, modem device 532 forwards PDUs 1002-1 to network slice 210-5 over path 1004-1 and PDUs 1002-2 to network slice 210-6 over path 1004-2.

Figure 11:
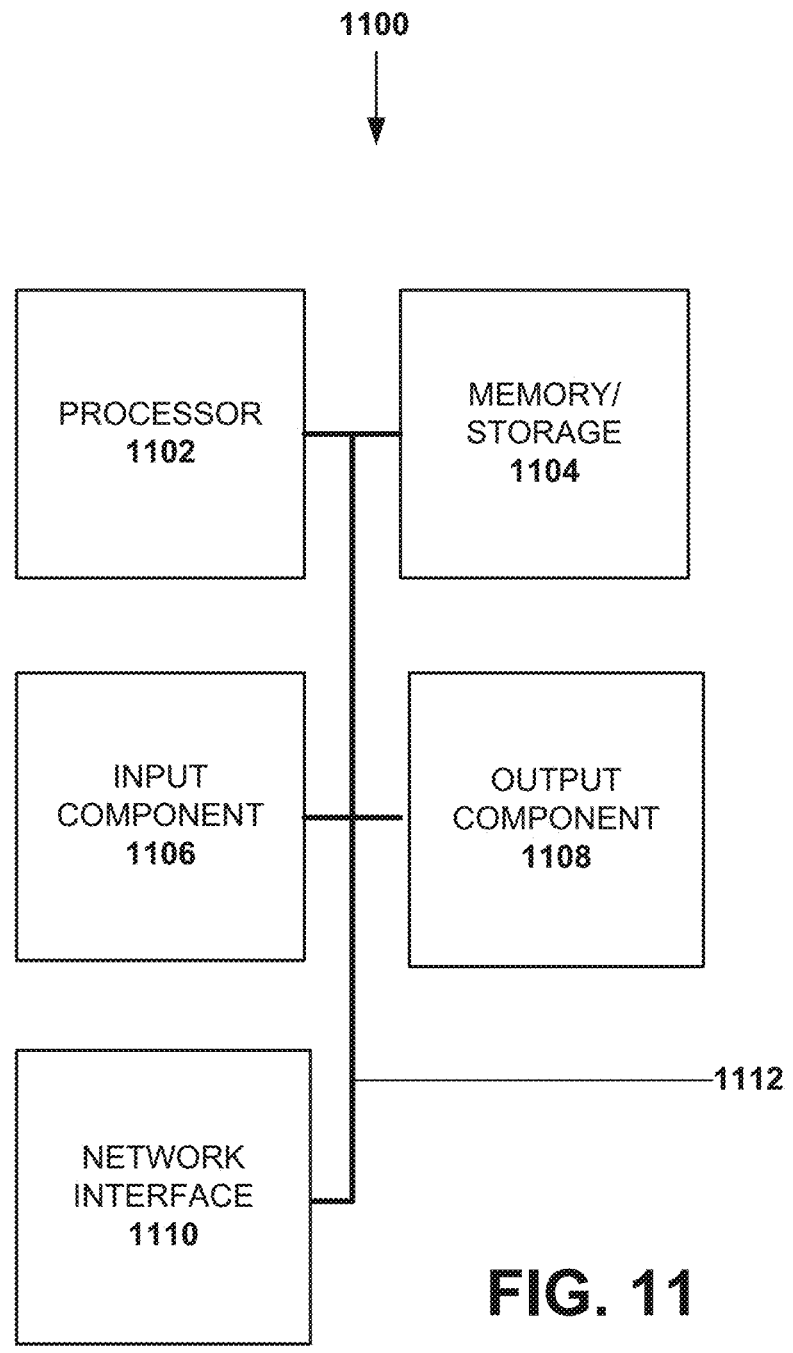
FIG. 11 is a block diagram illustrating exemplary components of a network device.

FIG. 11 depicts exemplary components of an exemplary network device 1100. Network device 1100 corresponds to or is included in device 106, FWA 108, URSP MS 212, AUSF 506, UDM/UDR 508, URSP server 510, routers, switches, and/or any of the network components of FIGS. 1-3, 5A-5D, 7, 8A-8D, and 10 (e.g., a router, a network switch, servers, gateways, etc.). As shown, network device 1100 includes a processor 1102, memory/storage 1104, input component 1106, output component 1108, network interface 1110, and communication path 1112. In different implementations, network device 1100 may include additional, fewer, different, or a different arrangement of components than the ones illustrated in FIG. 11.

Processor 1102 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 1100 and/or executing programs/instructions.

Memory/storage 1104 may include static memory, such as read only memory (ROM), and/or dynamic memory, such as random access memory (RAM), or onboard cache, for storing data and machine-readable instructions (e.g., programs, scripts, etc.).

Memory/storage 1104 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1104 may be external to and/or removable from network device 1100. Memory/storage 1104 may include, for example, a Universal Serial Bus (USB) memory stick, a dongle, a hard disk, off-line storage, a Blu-Ray® disk (BD), etc. Memory/storage 1104 may also include devices that can function both as a RAM-like component or persistent storage. Depending on the context, the term "memory," "storage," "storage device," "storage unit," and/or "medium" may be used interchangeably. For example, a "computer-readable storage device" or "computer-readable medium" may refer to both a memory and/or storage device.

Input component 1106 and output component 1108 may provide input and output from/to a user to/from network device 1100. Input and output components 1106 and 1108 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 1100.

Network interface 1110 may include a transceiver (e.g., a transmitter and a receiver) for network device 1100 to communicate with other devices and/or systems. For example, via network interface 1110, network device 1100 may communicate with wireless station 202. Network interface 1110 may include an Ethernet interface to a LAN, and/or an interface/connection for connecting network device 1100 to other devices (e.g., a Bluetooth interface). For example, network interface 1110 may include a wireless modem for modulation and demodulation.

Communication path 1112 may enable components of network device 1100 to communicate with one another.

Network device 1100 may perform the operations described herein in response to processor 1102 executing software instructions stored in a non-transient computer-readable medium, such as memory/storage 1104. The software instructions may be read into memory/storage 1104 from another computer-readable medium or from another device via network interface 1110. The software instructions stored in memory or storage (e.g., memory/storage 1104, when executed by processor 1102, may cause processor 1102 to perform processes that are described herein. For example, device 106, FWA 108, and URSP MS 212 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and arrows have been described above with regard to the processes, messages, and signals illustrated in FIGS. 6 and 7, the order of the blocks, messages, and signals may be modified in other implementations. In addition, non-dependent blocks and/or arrows may represent blocks and/or arrows that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
   a memory to store a User Equipment Route Selection Policy (URSP); and
   one or more processors configured to:
      obtain network traffic comprising first network traffic and second network traffic, and wherein the second network traffic originates from one or more remote user equipment devices (UEs);
      apply the URSP to the network traffic; and
      in response to applying the URSP, forward protocol data units (PDUs) of the network traffic to either a first tunnel to a first network slice or a second tunnel to a second network slice, wherein when applying the URSP to the network traffic, the one or more processors are configured to:
      obtain one of a Media Access Control (MAC) address, which is assigned to a physical port via which the second network traffic arrives, or a token, which is transmitted by an application running on the remote UEs;
      use the MAC address or the token to look up, in a table, a traffic descriptor; and
      apply the URSP to the traffic descriptor to identify the first network slice or the second network slice; and
   wherein the first tunnel and the second tunnel are established from the device to the first network slice and the second network slice over a wireless communication link from the device to a radio access network (RAN).

2. The device of claim 1, wherein the first network slice includes a default network slice and the second network slice includes an ultra-high performance network slice.

3. The device of claim 1, wherein the first network traffic comprises one or more of:
   administration network traffic;
   Internet Multimedia Subsystem (IMS) traffic, or
   Internet traffic.

4. The device of claim 1, wherein the second network traffic comprises one or more of:
   gaming traffic;
   Internet traffic; or
   enterprise customer traffic.

5. The device of claim 1, wherein the device comprises a modem, and wherein the processor is further configured to:
   receive the second network traffic from a router device external to the device.

6. The device of claim 5, wherein when the processor receives the second network traffic from the router device, the processor is configured to:
   receive the second network traffic over Ethernet frames.

7. The device of claim 6, wherein the Ethernet frames include information for identifying traffic descriptors (TDs) of rules in the URSP.

8. The device of claim 5, wherein the router device is configured to:
   receive the second network traffic from the remote UEs over a wireless connection or a cable.

9. The device of claim 1, wherein network addresses of the first network slice and the second network slice include Internet Protocol version 4 (IPv4) addresses.

10. A method comprising:
   obtaining network traffic comprising first network traffic and second network traffic, and wherein the second network traffic originates from one or more remote user equipment devices (UEs);
   applying a User Equipment Route Selection Policy (URSP) to the network traffic; and
   in response to applying the URSP, forwarding protocol data units (PDUs) of the network traffic to either a first tunnel to a first network slice or a second tunnel to a second network slice,
   wherein applying the URSP to the network traffic comprises:
      obtaining one of a Media Access Control (MAC) address, which is assigned to a physical port via which the second network traffic arrives, or a token, which is transmitted by an application running on the remote UEs;
      using the MAC address or the token to look up, in a table, a traffic descriptor; and applying the URSP to the traffic descriptor to identify the first network slice or the second network slice; and wherein the first tunnel and the second tunnel are established from a device to the first network slice and the second network slice over communication paths that include at least a wireless communication link from the device to a radio access network (RAN).

11. The method of claim 10, wherein the first network slice includes a default network slice and the second network slice includes an ultra-high performance network slice.

12. The method of claim 10, wherein the first network traffic comprises one or more of:

administration network traffic;
Internet Multimedia Subsystem (IMS) traffic, or
Internet traffic.

13. The method of claim 10, wherein the second network traffic comprises one or more of:

gaming traffic;
Internet traffic; or
enterprise customer traffic.

14. The method of claim 10, further comprising:

receiving the second network traffic from a router device external to the device, wherein the device comprises a modem.

15. The method of claim 14, wherein when receiving the second network traffic from the router device comprises:

receiving the second network traffic over Ethernet frames.

16. The method of claim 14, wherein the Ethernet frames include information for identifying traffic descriptors (TDs) of rules in the URSP.

17. The method of claim 16, wherein the router device is configured to:

receive the second network traffic from the remote UEs over a wireless connection or a cable.

18. The method of claim 10, wherein network addresses of the first network slice and the second network slice include Internet Protocol version 4 (IPv4) addresses.

19. A system comprising:

a router device having a port; and
a modem device configured to:
obtain network traffic comprising first network traffic and second network traffic, wherein the second network traffic originates from one or more remote user equipment devices (UEs);
apply a User Equipment Route Selection Policy (URSP) to the network traffic; and
in response to applying the URSP, forward protocol data units (PDUs) of the network traffic to either a first tunnel to a first network slice or a second tunnel to a second network slice,
wherein when applying the URSP to the network traffic, the modem device is configured to:
obtain one of a Media Access Control (MAC) address, which is assigned to a physical port via which the second network traffic arrives, or a token, which is transmitted by an application running on the remote UEs;
use the MAC address or the token to look up, in a table, a traffic descriptor; and
apply the URSP to the traffic descriptor to identify the first network slice or the second network slice; and
wherein the first tunnel and the second tunnel are established from the modem device to the first network slice and the second network slice over communication paths that include at least a wireless communication link from the modem device to a radio access network (RAN).

20. The system of claim 19, wherein the first network slice includes a default network slice and the second network slice includes an ultra-high performance network slice.

\* \* \* \* \*